US012670782B2

(12) United States Patent　　　　　(10) Patent No.:　US 12,670,782 B2
Trepanier et al.　　　　　　　　　　(45) Date of Patent:　　＊Jun. 30, 2026

(54) SYSTEMS AND APPARATUSES FOR PROMOTING COMMUNICATION INTEGRITY BETWEEN PATIENT SUPPORT APPARATUSES AND A NURSE CALL SYSTEM

(71) Applicant: Stryker Corporation, Kalamazoo, MI (US)

(72) Inventors: Jerald A. Trepanier, Augusta, MI (US); Alexander Josef Bodurka, Portage, MI (US); Krishna Sandeep Bhimavarapu, Kalamazoo, MI (US); Vinod Prakash Bhatt, Haryana (IN); Ashutosh Mishra, State Uttar Pradesh (IN)

(73) Assignee: Stryker Corporation, Portage, MI (US)

( * ) Notice: Subject to any disclaimer, the term of this patent is extended or adjusted under 35 U.S.C. 154(b) by 27 days.

This patent is subject to a terminal disclaimer.

(21) Appl. No.: 18/780,979

(22) Filed: Jul. 23, 2024

(65) Prior Publication Data

US 2024/0378988 A1　　Nov. 14, 2024

Related U.S. Application Data

(63) Continuation of application No. 17/825,013, filed on May 26, 2022, now Pat. No. 12,046,124.

(30) Foreign Application Priority Data

May 27, 2021　　(IN) .............................. 202111023647

(51) Int. Cl.
*G08B 29/00*　　　(2006.01)
*G08B 21/18*　　　(2006.01)
*H04L 67/12*　　　(2022.01)

(52) U.S. Cl.
CPC ........... *G08B 29/00* (2013.01); *G08B 21/182* (2013.01); *H04L 67/12* (2013.01)

(58) Field of Classification Search
CPC ........ G08B 29/00; G08B 21/182; H04L 67/12
(Continued)

(56) References Cited

U.S. PATENT DOCUMENTS 5,537,095 A * 7/1996 Dick ....................... A61F 13/42
　　　　　　　　　　　　　　　340/573.5
7,852,208 B2 * 12/2010 Collins, Jr. ........... A61B 5/1115
　　　　　　　　　　　　　　　340/286.07
(Continued)

*Primary Examiner* — Zhen Y Wu
(74) *Attorney, Agent, or Firm* — Gardner, Linn, Burkhart & Ondersma LLP

(57) ABSTRACT

A wireless communication system for exchanging messages between a patient support apparatus and a headwall unit includes intelligence built into either or both of these devices (and/or a server) for detecting when a mismatch occurs between the communication capabilities of the patient support apparatus and those of the headwall unit. A warning is issued in those situations where a caregiver is relying on communication abilities that are not present in one or both of the devices. Examples of such situations include, but are not limited to, a nurse call cable not being coupled between the patient support apparatus and the nurse call system when the patient support apparatus does not have the capability to wirelessly communicate with the nurse call system. Alternatively, or additionally, the headwall unit may issue an alert to a nurse call system if it detects one or more conditions that warrant immediate caregiver attention.

17 Claims, 13 Drawing Sheets

(58) Field of Classification Search
USPC ................................................... 340/286.07
See application file for complete search history.

(56)                    References Cited

U.S. PATENT DOCUMENTS

| | | | |
|---|---|---|---|
| 10,085,905 B2 * | 10/2018 | Bhimavarapu | .......... A61G 7/05 |
| 10,235,845 B2 * | 3/2019 | Bhimavarapu | ........ G08B 5/228 |
| 10,679,489 B2 * | 6/2020 | Bodurka | .............. G08B 25/004 |
| 11,110,020 B2 * | 9/2021 | Bodurka | ................. H04L 67/12 |
| 2002/0167417 A1 * | 11/2002 | Welles, II | .......... G08B 13/2488 |
| | | | 340/8.1 |
| 2003/0102172 A1 * | 6/2003 | Kummer | .............. A61G 7/0528 |
| | | | 180/19.1 |
| 2005/0219059 A1 * | 10/2005 | Ulrich | ................... G08B 5/222 |
| | | | 340/286.07 |
| 2007/0210917 A1 * | 9/2007 | Collins | ................. G08B 5/222 |
| | | | 340/539.1 |
| 2012/0051490 A1 * | 3/2012 | Hussain | ................. G06F 21/86 |
| | | | 377/15 |
| 2016/0038361 A1 * | 2/2016 | Bhimavarapu | .... H04B 10/1149 |
| 2017/0261405 A1 * | 9/2017 | Estevo | ................ G01M 99/007 |
| 2019/0046379 A1 * | 2/2019 | Constant | ............... G16H 40/63 |
| 2019/0150737 A1 * | 5/2019 | Bodurka | ................ A61G 7/018 |
| 2019/0183705 A1 * | 6/2019 | Bodurka | .................. H04B 5/48 |
| 2019/0188992 A1 * | 6/2019 | Bodurka | ................ H04L 43/10 |
| 2019/0244707 A1 * | 8/2019 | Becker | ................... H04L 67/52 |

* cited by examiner

270

Headwall Unit
(Gen 1)

272

Receive
interrogation signal

274 —— Reply with ID and
battery status

280

Patient Support Apparatus
(Gen 1)

282

Transmit
interrogation signal

284 —— Receive headwall
unit ID and
battery status

Issue warning if
headwall battery
below threshold

286

96, 98

96, 98

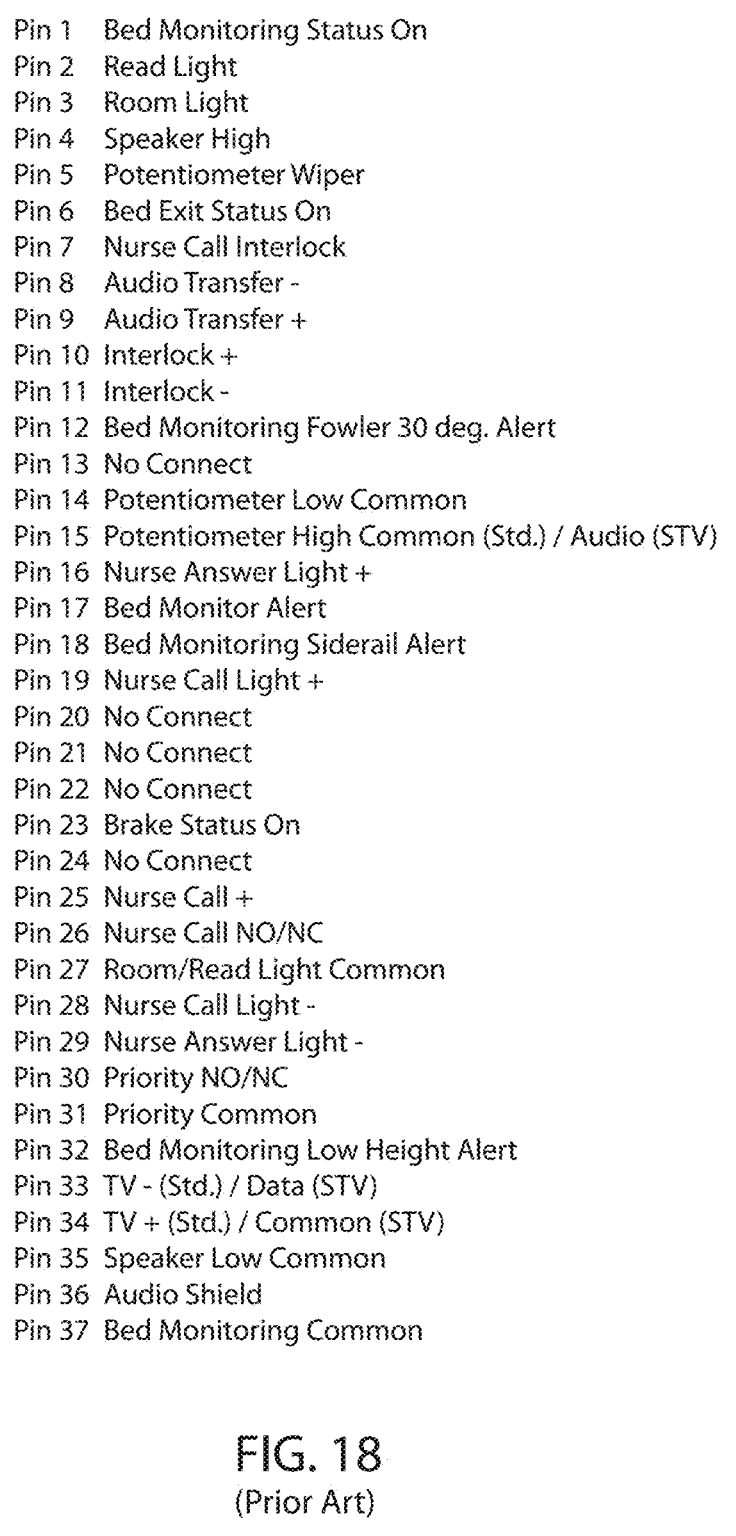

Pin 1    Bed Monitoring Status On
Pin 2    Read Light
Pin 3    Room Light
Pin 4    Speaker High
Pin 5    Potentiometer Wiper
Pin 6    Bed Exit Status On
Pin 7    Nurse Call Interlock
Pin 8    Audio Transfer -
Pin 9    Audio Transfer +
Pin 10  Interlock +
Pin 11  Interlock -
Pin 12  Bed Monitoring Fowler 30 deg. Alert
Pin 13  No Connect
Pin 14  Potentiometer Low Common
Pin 15  Potentiometer High Common (Std.) / Audio (STV)
Pin 16  Nurse Answer Light +
Pin 17  Bed Monitor Alert
Pin 18  Bed Monitoring Siderail Alert
Pin 19  Nurse Call Light +
Pin 20  No Connect
Pin 21  No Connect
Pin 22  No Connect
Pin 23  Brake Status On
Pin 24  No Connect
Pin 25  Nurse Call +
Pin 26  Nurse Call NO/NC
Pin 27  Room/Read Light Common
Pin 28  Nurse Call Light -
Pin 29  Nurse Answer Light -
Pin 30  Priority NO/NC
Pin 31  Priority Common
Pin 32  Bed Monitoring Low Height Alert
Pin 33  TV - (Std.) / Data (STV)
Pin 34  TV + (Std.) / Common (STV)
Pin 35  Speaker Low Common
Pin 36  Audio Shield
Pin 37  Bed Monitoring Common

FIG. 18

(Prior Art)

SYSTEMS AND APPARATUSES FOR PROMOTING COMMUNICATION INTEGRITY BETWEEN PATIENT SUPPORT APPARATUSES AND A NURSE CALL SYSTEM

CROSS-REFERENCE TO RELATED APPLICATIONS

This application claims priority to U.S. patent application Ser. No. 17/825,13 filed May 26, 2022, by application Stryker Corporation and entitled SYSTEMS AND APPARATUSES FOR PROMOTING COMMUNICATION INTEGRITY BETWEEN PATIENT SUPPORT APPARATUSES AND A NURSE CALL SYSTEM, which in turn claims priority to Indian patent application No. 202111023647 filed May 27, 2021, by applicant Stryker Corporation and entitled SYSTEMS AND APPARATUSES FOR PROMOTING COMMUNICATION INTEGRITY BETWEEN PATIENT SUPPORT APPARATUSES AND A NURSE CALL SYSTEM, the complete disclosures of both of which are incorporated herein by reference.

BACKGROUND

The present disclosure relates to patient support apparatuses, such as beds, cots, stretchers, recliners, or the like, that are adapted to communicate with an existing nurse call system and/or one or more room devices.

Existing hospital beds often include an exit detection system that detects when the patient leaves the bed and notifies a nurse call system that the patient has left the bed. Existing hospital beds also often include a nurse call button and speaker that allow the patient to communicate with a remote nurse using the nurse call system. If the communication between the hospital bed and the nurse call system fails, or is not set up properly, the patient on the hospital bed may not be able to summon a caregiver for assistance.

SUMMARY

According to various embodiments, the present disclosure provides an improved system for helping to ensure that caregivers properly set up the communication link between the hospital bed and the nurse call system. In some embodiments, the communication link uses a wireless headwall unit that must be coupled, such as via a cable, to the nurse call system, and the present disclosure provides warnings and/or reminders if the caregiver fails to complete this coupling. In other aspects, different technological generations of beds and wireless headwall units may be present in a common healthcare facility, and the present disclosure provides a warning to the caregiver whenever a bed having a set of communication abilities is utilized with a wireless headwall unit having a mismatched set of communication abilities, or vice versa. Such warnings may be selectively issued for only particular situations, such as where the mismatch between the communication capabilities of the bed and the wireless headwall unit are liable to, or actually do, result in a malfunction (or non-establishment) of the communication link between the bed and the nurse call system. Other warnings may also be provided when the integrity of the communication link between the bed and the nurse call system fails, or may be about to fail (e.g. when a battery onboard the bed and/or the headwall unit falls below a threshold charge level and the device is not coupled to a mains electrical supply).

According to a first embodiment of the present disclosure, a headwall unit is provided that is adapted to be mounted to a headwall of a room in a healthcare facility and used as part of the communication link between a patient support apparatus and a nurse call system. The headwall unit includes a nurse call interface, a first infrared transceiver, a first radio frequency transceiver, a battery, and a controller. The nurse call interface is adapted to electrically couple to a wall outlet mounted in the headwall. The nurse call interface includes a plurality of first pins adapted to electrically couple to a plurality of second pins defined in the wall outlet when the nurse call interface is coupled to the wall outlet. The first infrared transceiver is adapted to wirelessly communicate with a second infrared transceiver positioned onboard the patient support apparatus when the patient support apparatus is positioned adjacent to the headwall unit. The first radio frequency transceiver is adapted to wirelessly communicate with a second radio frequency transceiver positioned off-board the headwall unit (either on the patient support apparatus or elsewhere). The battery supplies power to the headwall unit and the controller is adapted to monitor a charge level of the battery and to stop electrically shorting together a pair of the first pins when the charge level of the battery falls below a threshold.

According to another aspect of the present disclosure, the controller is further adapted to send a message to the patient support apparatus via at least one of the first infrared transceiver or the first radio frequency transceiver in response to the charge level of the battery falling below the threshold. The message indicates that the charge level of the battery has fallen below the threshold.

The controller, in some embodiments, is further adapted to receive audio signals from the patient support apparatus via at least one of the first infrared transceiver or the first radio frequency transceiver, and to forward the audio signals to at least one of the first pins.

In some embodiments, the controller is further adapted to receive an exit alert message from the patient support apparatus and to change an electrical state of at least one of the first pins in response to receiving the exit alert message.

The headwall unit, in some embodiments, includes a memory in which is stored a unique identifier that uniquely identifies the headwall unit. In such embodiments, the controller may be adapted to forward the unique identifier to the patient support apparatus using at least one of the first infrared transceiver or the first radio frequency transceiver.

The controller, in some embodiments, is adapted to receive a configuration message via at least one of the first infrared transceiver or the first radio frequency transceiver, and wherein the configuration message includes an identification of the pair of first pins and the controller is adapted to store in a memory onboard the headwall unit the identification of the first pair of pins.

In some embodiments, the controller is further adapted to receive a new configuration message via at least one of the first infrared transceiver or the first radio frequency transceiver. The new configuration message includes a new identification of the pair of first pins and the controller is adapted to replace the identification with the new identification in the memory.

The controller, in some embodiments, is further adapted to send a configuration status message to the patient support apparatus that includes the identification of the first pair of pins.

The controller, in some embodiments, is further adapted to detect if the nurse call interface is currently electrically coupled to the wall outlet or not, and to transmit a disconnection message to the patient support apparatus if the nurse call interface is not currently electrically coupled to the wall outlet.

The controller may further be adapted, in some embodiments, to analyze a message received from the patient support apparatus via the first infrared transceiver to determine if the patient support apparatus belongs to a first class or a second class of patient support apparatuses. The first class of patient support apparatuses may adapted to wirelessly transmit audio signals to the first radio frequency transceiver of the headwall unit, while the second class of patient support apparatuses is not adapted to wirelessly transmit audio signals to the first radio frequency transceiver of the headwall unit.

In some embodiments, the controller is further adapted to stop electrically shorting together the first pair of pins if the controller detects both of the following: (a) the nurse call interface is currently electrically coupled to the wall outlet, and (b) the patient support apparatus belongs to the second class of patient support apparatuses.

In some embodiments, the controller is further adapted electrically short together a second pair of the first pins when the charge level of the battery falls below the threshold.

The controller, in some embodiments, is further adapted to stop electrically shorting together the pair of first pins when the controller detects an unexpected interruption in communications between the headwall unit and the patient support apparatus.

The headwall unit, in some embodiments, further includes a cancel control in communication with the controller. In such embodiments, the controller may be adapted to stop electrically shorting together the pair of first pins in response to the cancel control being activated only if both of the following are true: (a) the controller has detected an unexpected interruption in communications between the headwall unit and the patient support apparatus, and (b) the charge level of the battery has not fallen below the threshold.

The controller is further adapted to receive a charge level warning message in some embodiments. The charge level warning message comes from the patient support apparatus and is sent in response to a second battery onboard the patient support apparatus falling below a particular charge level and the patient support apparatus not being coupled to a mains electrical supply. The controller may be further adapted to stop electrically shorting together the pair of first pins in response to receiving the charge level warning message from the patient support apparatus.

In some embodiments, the headwall unit further comprises a plug adapted to be electrically coupled to a mains supply of electrical power. In such embodiments the controller is further adapted to electrically only short together the first pair of pins when the charge level of the battery falls below the threshold if the plug is not electrically coupled to the mains supply of electrical power.

According to another embodiment of the present disclosure, a headwall unit is provided that is adapted to be mounted to a headwall of a room in a healthcare facility and used as part of the communication link between a patient support apparatus and a nurse call system. The headwall unit includes a nurse call interface, a first infrared transceiver, a first radio frequency transceiver, a battery, and a controller. The nurse call interface is adapted to electrically couple to a wall outlet mounted in the headwall. The nurse call interface includes a plurality of first pins adapted to electrically couple to a plurality of second pins defined in the wall outlet when the nurse call interface is coupled to the wall outlet. The first infrared transceiver is adapted to wirelessly communicate with a second infrared transceiver positioned onboard the patient support apparatus when the patient support apparatus is positioned adjacent to the headwall unit. The first radio frequency transceiver is adapted to wirelessly communicate with a second radio frequency transceiver positioned offboard the headwall unit (either on the patient support apparatus or elsewhere). The controller is adapted to receive a charge level warning message from the patient support apparatus in response to a battery onboard the patient support apparatus falling below a particular charge level and the patient support apparatus not being coupled to a mains electrical supply. The controller is further adapted to stop electrically shorting together a pair of the first pins in response to receiving the charge level warning message.

According to other aspects, the headwall unit may further comprise a plug and a second battery. The plug is adapted to be electrically coupled to a mains supply of electrical power and the second battery adapted to supply electrical power to the headwall unit. The controller is further adapted to monitor a charge level of the second battery and to stop electrically shorting together the pair of first pins if the charge level of the second battery falls below a threshold while the plug is not electrically coupled to the mains supply of electrical power.

In some embodiments, the controller is further adapted to stop electrically shorting together the first pair of pins when the controller detects an unexpected interruption in communications between the headwall unit and the patient support apparatus.

The headwall unit, in some embodiments, further comprises a cancel control in communication with the controller, wherein the controller is adapted to resume electrically shorting together the pair of first pins in response to the cancel control being activated only if all three of the following are true: (a) the controller has detected an unexpected interruption in communications between the headwall unit and the patient support apparatus, (b) the charge level of the second battery has not fallen below the threshold, and (c) the controller has not received the charge level warning message from the patient support apparatus.

The controller is further adapted, in some embodiments, to detect if the nurse call interface is currently electrically coupled to the wall outlet or not, and to transmit a disconnection message to the patient support apparatus if the nurse call interface is not currently electrically coupled to the wall outlet.

In some embodiments, the controller is adapted to analyze a message received from the patient support apparatus via the first infrared transceiver to determine if the patient support apparatus belongs to a first class or a second class of patient support apparatuses. The first class of patient support apparatuses are adapted to wirelessly transmit audio signals to the first radio frequency transceiver of the headwall unit, and the second class of patient support apparatuses are not adapted to wirelessly transmit audio signals to the first radio frequency transceiver of the headwall unit.

In some embodiments, the controller is further adapted to stop electrically shorting together the first pair of pins if the controller detects both of the following: (a) the nurse call interface is currently electrically coupled to the wall outlet, and (b) the patient support apparatus belongs to the second class of patient support apparatuses.

In some embodiments, the controller is adapted to transmit an alert message via the first radio frequency transceiver if the controller detects both of the following: (a) the nurse call interface is currently electrically coupled to the wall outlet, and (b) the patient support apparatus belongs to the second class of patient support apparatuses.

The first radio frequency transceiver, in some embodiments, is adapted to communicate with a wireless access point of a healthcare facility computer network, and the alert message is addressed to a server on the healthcare facility computer network.

The controller, in some embodiments, is adapted to receive audio signals from the patient support apparatus via at least one of the first infrared transceiver or the first radio frequency transceiver, as well as to forward the audio signals to at least one of the first pins.

In some embodiments, the controller is further adapted to receive an exit alert message from the patient support apparatus and to change an electrical state of at least one of the first pins in response to receiving the exit alert message.

The headwall unit, in some embodiments, includes a memory in which is stored a unique identifier that uniquely identifies the headwall unit. The controller is further adapted to forward the unique identifier to the patient support apparatus using at least one of the first infrared transceiver or the first radio frequency transceiver.

The controller, in some embodiments, is adapted to receive a configuration message via at least one of the first infrared transceiver or the first radio frequency transceiver, and the configuration message includes an identification of the pair of first pins. The controller is adapted to store in a memory onboard the headwall unit the identification of the first pair of pins.

In some embodiments, the controller is further adapted to receive a new configuration message via at least one of the first infrared transceiver or the first radio frequency transceiver. The new configuration message includes a new identification of the pair of first pins and the controller is adapted to replace the identification with the new identification in the memory.

According to another embodiment of the present disclosure, a headwall unit is provided that is adapted to be mounted to a headwall of a room in a healthcare facility and used as part of the communication link between a patient support apparatus and a nurse call system. The headwall unit includes a nurse call interface, a first infrared transceiver, a first radio frequency transceiver, a battery, and a controller. The nurse call interface is adapted to electrically couple to a wall outlet mounted in the headwall. The nurse call interface includes a plurality of first pins adapted to electrically couple to a plurality of second pins defined in the wall outlet when the nurse call interface is coupled to the wall outlet. The first infrared transceiver is adapted to wirelessly communicate with a second infrared transceiver positioned onboard the patient support apparatus when the patient support apparatus is positioned adjacent to the headwall unit. The first radio frequency transceiver is adapted to wirelessly communicate with a second radio frequency transceiver positioned offboard the headwall unit (either on the patient support apparatus or elsewhere). The controller is adapted to analyze a message received from the patient support apparatus via the first infrared transceiver to determine if the patient support apparatus belongs to a first class or a second class of patient support apparatuses.

In some embodiments, the first class of patient support apparatuses are adapted to wirelessly transmit audio signals to the first radio frequency transceiver of the headwall unit, and the second class of patient support apparatuses are not adapted to wirelessly transmit audio signals to the first radio frequency transceiver of the headwall unit.

The headwall unit, in some embodiments, further includes a network transceiver adapted to communicate with a wireless access point of a healthcare facility computer network. In such embodiments, the controller may be adapted to transmit a class identification message to a server on the healthcare facility computer network using the network transceiver, wherein the class identification message indicates what class the patient support apparatus belongs to.

The headwall unit, in some embodiments, is adapted to receive audio signals from the patient support apparatus via at least one of the first infrared transceiver or the first radio frequency transceiver, and to forward the audio signals to at least one of the first pins.

The controller, in some embodiments, is further adapted to receive an exit alert message from the patient support apparatus and to change an electrical state of at least one of the first pins in response to receiving the exit alert message.

The headwall unit, in some embodiments, further includes a memory in which is stored a unique identifier that uniquely identifies the headwall unit. In such embodiments, the controller is further adapted to forward the unique identifier to the patient support apparatus using at least one of the first infrared transceiver or the first radio frequency transceiver.

In some embodiments, the headwall unit further includes a plug adapted to be electrically coupled to a mains supply of electrical power and a battery adapted to supply electrical power to the headwall unit. The controller, in such embodiments, may be further adapted to monitor a charge level of the battery and to stop electrically shorting together a pair of the first pins if the charge level of the battery falls below a threshold while the plug is not electrically coupled to the mains supply of electrical power.

The controller, in some embodiments, is further adapted to stop electrically shorting together the pair of first pins when the controller detects an unexpected interruption in communications between the headwall unit and the patient support apparatus.

The headwall unit, in some embodiments, further includes a cancel control in communication with the controller. The controller is adapted to resume electrically shorting together the pair of first pins in response to the cancel control being activated only if both of the following are true: (a) the controller has detected an unexpected interruption in communications between the headwall unit and the patient support apparatus, and (b) the charge level of the battery has not fallen below the threshold.

The controller is further adapted, in some embodiments, to receive a charge level warning message from the patient support apparatus in response to a battery onboard the patient support apparatus falling below a particular charge level and the patient support apparatus not being coupled to a mains electrical supply. The controller is further adapted to stop electrically shorting together a pair of the first pins in response to receiving the charge level warning message.

In some embodiments, the controller is further adapted to receive a television control message from the patient support apparatus and to change an electrical state of a television control pin that is one of the first pins.

According to another embodiment of the present disclosure, a patient support apparatus is provided that includes a support surface, a first infrared transceiver, a first radio frequency transceiver, and a controller. The first infrared transceiver is adapted to wirelessly communicate with a second infrared transceiver positioned onboard a headwall unit mounted to a headwall of a room of a healthcare facility. The first radio frequency transceiver is adapted to wirelessly communicate with a second radio frequency transceiver positioned off-board the patient support apparatus. The controller is adapted to analyze a message received from the headwall unit via the first infrared transceiver to determine if the headwall unit belongs to a first class or a second class of headwall units.

In some embodiments, the first class of headwall units are adapted to wirelessly transmit audio signals to the first radio frequency transceiver of the patient support apparatus, and the second class of headwall units are not adapted to wirelessly transmit audio signals to the first radio frequency transceiver of the patient support apparatus.

The patient support apparatus, in some embodiments, further includes a network transceiver adapted to communicate with a wireless access point of a healthcare facility computer network. In such embodiments, the controller may be adapted to transmit a class identification message to a server on the healthcare facility computer network using the network transceiver. The class identification message indicates what class the headwall unit belongs to.

The patient support apparatus, in some embodiments, further includes a nurse call cable interface adapted to be coupled by a nurse call cable to a wall outlet mounted in the headwall, and a sensor adapted to detect when the nurse call cable interface is not electrically coupled to the wall outlet.

The controller, in some embodiments, is further adapted to issue an alert if controller detects both of the following: (a) the nurse call cable interface is not currently electrically coupled to the wall outlet, and (b) the headwall unit belongs to the second class of patient support apparatuses.

The controller, in some embodiments, is adapted to issue the alert by displaying an indicator on a screen of a display attached to the patient support apparatus.

The patient support apparatus, in some embodiments, further includes a network transceiver adapted to communicate with a wireless access point of a healthcare facility computer network. In such embodiments, the controller is further adapted to issue the alert by sending an alert message to a server of the healthcare facility computer network using the network transceiver.

In some embodiments, the controller is further adapted to send a television control message to the headwall unit that is adapted to change a state of a television in communication with the headwall unit.

The patient support apparatus, in some embodiments, further includes an exit detection system adapted to detect when a patient onboard the patient support apparatus exits therefrom. In such embodiments, the controller may further be adapted to send an exit detection message to the headwall unit that is adapted to notify a nurse call system of the patient's exit from the patient support apparatus.

According to another embodiment of the present disclosure, a patient support apparatus communication system is provided that includes a headwall unit, a patient support apparatus, and a server. The headwall unit is adapted to be mounted to a headwall of a room of a healthcare facility. The patient support apparatus is adapted to support a patient thereon and to wirelessly communicate with the headwall unit when the patient support apparatus is positioned adjacent thereto. The server is adapted to communicate with the patient support apparatus and to determine if the patient support apparatus belongs to a first class or a second class of patient support apparatuses. The server is further adapted to determine if the headwall unit belongs to a third class or a fourth class of headwall units. Still further, the server is adapted to send a warning message to a caregiver if the patient support apparatus belongs to the first class and the headwall unit belongs to the fourth class, but to not send the warning message to the caregiver if the patient support apparatus belongs to the first class and the headwall unit belongs to the third class.

In some embodiments, the server is further adapted to send the warning message to the caregiver if the patient support apparatus belongs to the second class and the headwall unit belongs to the third class.

The server, in some embodiments, is further adapted to not send the warning message to the caregiver if the patient support apparatus belongs to the second class and the headwall unit belongs to the fourth class.

The first class of patient support apparatuses, in some embodiments, are adapted to wirelessly transmit patient audio signals to a radio frequency transceiver of the headwall unit, and the second class of patient support apparatuses are not adapted to wirelessly transmit patient audio signals to the radio frequency transceiver of the headwall unit.

The third class of headwall units, in some embodiments, are adapted to wirelessly transmit nurse audio signals to the patient support apparatus and the fourth class of headwall units are not adapted to wirelessly transmit nurse audio signals to the patient support apparatus.

The server, in some embodiments, is adapted to send the warning message to the caregiver by sending a message to the patient support apparatus that causes the patient support apparatus to display a warning on a display of the patient support apparatus.

The server, in some embodiments, is adapted to send the warning message to the caregiver by sending a message to a portable electronic device associated with caregiver.

The headwall unit, in some embodiments, includes a nurse call interface and a first infrared transceiver. The nurse call interface is adapted to electrically couple to a wall outlet mounted in the headwall. The nurse call interface includes a plurality of first pins adapted to electrically couple to a plurality of second pins defined in the wall outlet when the nurse call interface is coupled to the wall outlet. The first infrared transceiver is adapted to wirelessly communicate with a second infrared transceiver positioned onboard the patient support apparatus when the patient support apparatus is positioned adjacent to the headwall unit.

In some embodiments, the patient support apparatus further includes a first infrared transceiver adapted to wirelessly communicate with a second infrared transceiver positioned onboard the headwall unit.

Before the various embodiments disclosed herein are explained in detail, it is to be understood that the claims are not to be limited to the details of operation or to the details of construction and the arrangement of the components set forth in the following description or illustrated in the drawings. The embodiments described herein are capable of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the claims to any specific order or number of components. Nor should the use of enumeration be construed as excluding from the scope of the claims any additional steps or components that might be combined with or into the enumerated steps or components.

BRIEF DESCRIPTION OF THE DRAWINGS

FIG. 18 is a chart of a prior art example of the functions of the pins of a 37-pin cable often used in existing healthcare facilities.

DETAILED DESCRIPTION OF THE EMBODIMENTS

Figure 1:
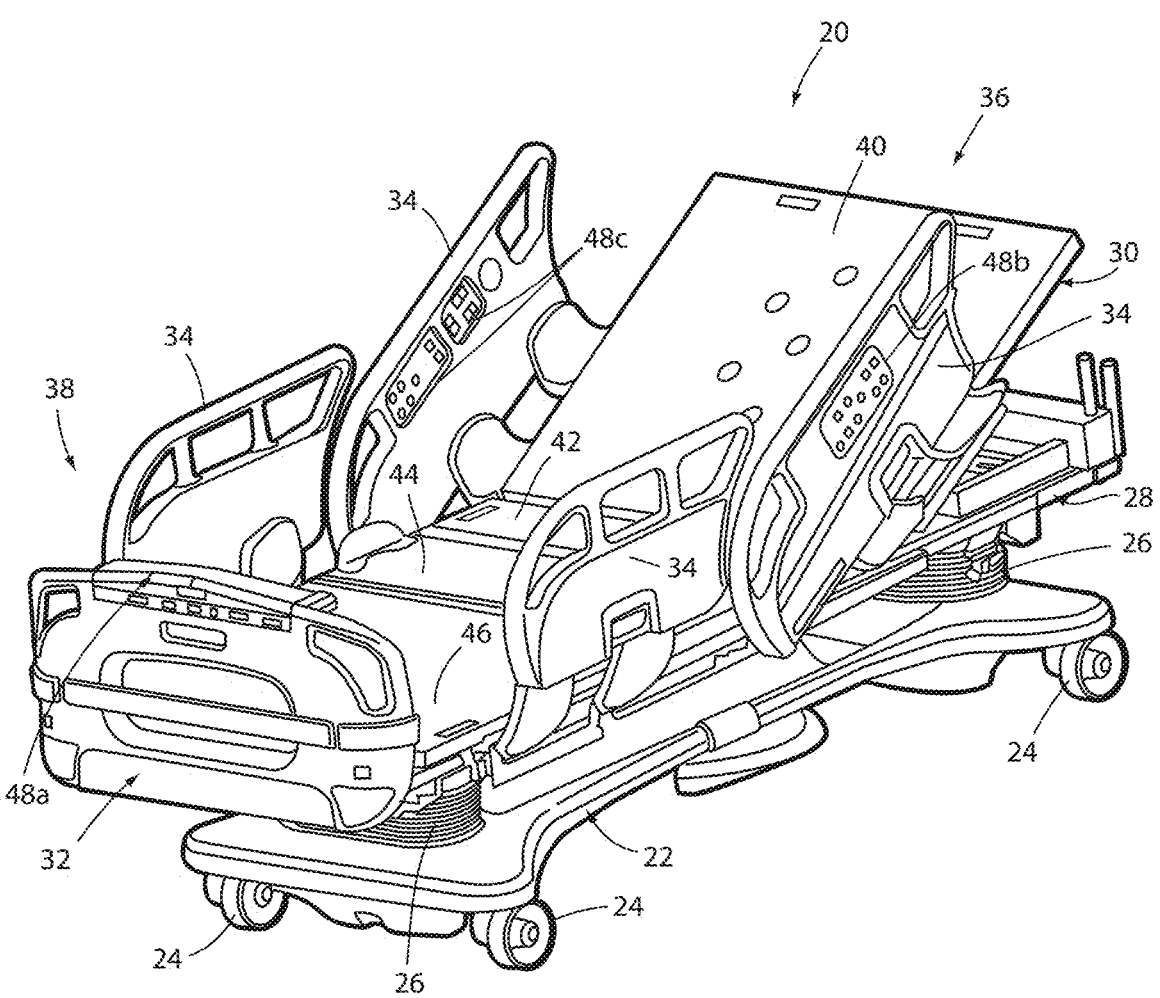
FIG. 1 is a perspective view of a patient support apparatus according to a first embodiment of the present disclosure.

An illustrative patient support apparatus 20 according to a first embodiment of the present disclosure is shown in FIG. 1. Although the particular form of patient support apparatus 20 illustrated in FIG. 1 is a bed adapted for use in a hospital or other medical setting, it will be understood that patient support apparatus 20 could, in different embodiments, be a cot, a stretcher, a recliner, a chair, or any other patient support structure that communicates with a nurse call outlet of a conventional nurse call system.

In general, patient support apparatus 20 includes a base 22 having a plurality of wheels 24, a pair of lifts 26 supported on the base 22, a litter frame 28 supported on the lifts 26, and a support deck 30 supported on the litter frame 28. Patient support apparatus 20 further includes a footboard 32 and a plurality of side rails 34. Side rails 34 are all shown in a raised position in FIG. 1 but are each individually movable to a lower position in which ingress into, and egress out of, patient support apparatus 20 is not obstructed by the lowered side rails 34.

Lifts 26 are adapted to raise and lower litter frame 28 with respect to base 22. Lifts 26 may be hydraulic actuators, pneumatic actuators, electric actuators, or any other suitable device for raising and lowering litter frame 28 with respect to base 22. In the illustrated embodiment, lifts 26 are operable independently so that the tilting of litter frame 28 with respect to base 22 can also be adjusted. That is, litter frame 28 includes a head end 36 and a foot end 38, each of whose height can be independently adjusted by the nearest lift 26. Patient support apparatus 20 is designed so that when an occupant lies thereon, his or her head will be positioned adjacent head end 36 and his or her feet will be positioned adjacent foot end 38.

Litter frame 28 provides a structure for supporting support deck 30, footboard 32, and side rails 34. Support deck 30 provides a support surface for a mattress (not shown in FIG. 1), such as, but not limited to, an air, fluid, or gel mattress. Alternatively, another type of soft cushion may be supported on support deck 30 so that a person may comfortably lie and/or sit thereon. The top surface of the mattress or other cushion forms a support surface for the occupant.

Support deck 30 is made of a plurality of sections, some of which are pivotable about generally horizontal pivot axes. In the embodiment shown in FIG. 1, support deck 30 includes a head section 40, a seat section 42, a thigh section 44, and a foot section 46. Head section 40, which is also sometimes referred to as a Fowler section, is pivotable about a generally horizontal pivot axis between a generally horizontal orientation (not shown in FIG. 1) and a plurality of raised positions (one of which is shown in FIG. 1). Thigh section 44 and foot section 46 may also be pivotable about generally horizontal pivot axes.

Patient support apparatus 20 further includes a plurality of control panels 48 that enable a user of patient support apparatus 20, such as a patient and/or an associated caregiver, to control one or more aspects of patient support apparatus 20. In the embodiment shown in FIG. 1, patient support apparatus 20 includes a footboard control panel 48*a*, a pair of outer side rail control panels 48*b* (only one of which is visible), and a pair of inner side rail control panels 48*c* (only one of which is visible). Footboard control panel 48*a* and outer side rail control panels 48*b* are intended to be used by caregivers, or other authorized personnel, while inner side rail control panels 48*c* are intended to be used by the patient associated with patient support apparatus 20. Each of the control panels 48 includes a plurality of controls (not shown), although each control panel 48 does not necessarily include the same controls and/or functionality.

Among other functions, controls 126 of control panel 48*a* (FIG. 7) allow a user to control one or more of the following: change a height of litter frame 28, raise or lower head section 40, activate and deactivate a brake for wheels 24, arm and disarm an exit detection system, etc. One or both of the inner siderail control panels 54c also include at least one control that enables a patient to call a remotely located nurse (or other caregiver). In addition to the nurse call control, one or both of the inner siderail control panels 54c also include one or more controls for controlling one or more features of one or more room devices positioned within the same room as the patient support apparatus 20. As will be described in more detail below, such room devices include, but are not necessarily limited to, a television, a reading light, and/or a room light. With respect to the television, the features that may be controllable by one or more controls on control panel 48c include, but are not limited to, the volume, the channel, the closed-captioning, and/or the power state of the television. With respect to the room and/or night lights, the features that may be controlled by one or more controls on control panel 48c include the on/off state and/or the brightness level of these lights.

Footboard control panel 48a is implemented in the embodiment shown in FIG. 1 as a control panel having a lid (flipped down in FIG. 1) underneath which is positioned a plurality of controls. As with all of the controls of the various control panels 48, the controls of control panel 48a may be implemented as buttons, dials, switches, or other devices. Any of control panels 48a-c may also include a display for displaying information regarding patient support apparatus 20. The display is a touchscreen in some embodiments.

In some embodiments, footboard control panel 48a may take on the form of the footboard control panel 54a disclosed in commonly assigned PCT patent application serial number PCT/US2021/32426 filed May 14, 2021, by applicant Stryker Corporation and entitled PATIENT SUPPORT APPARATUSES WITH HEADWALL COMMUNICATION, the complete disclosure of which is incorporated herein by reference. Additionally, or alternatively, patient control panel 48c may take on the form of the patient control panel 54c disclosed in the aforementioned PCT patent application. Other types of footboard control panels 48a-c may, of course, be implemented.

Figure 2:
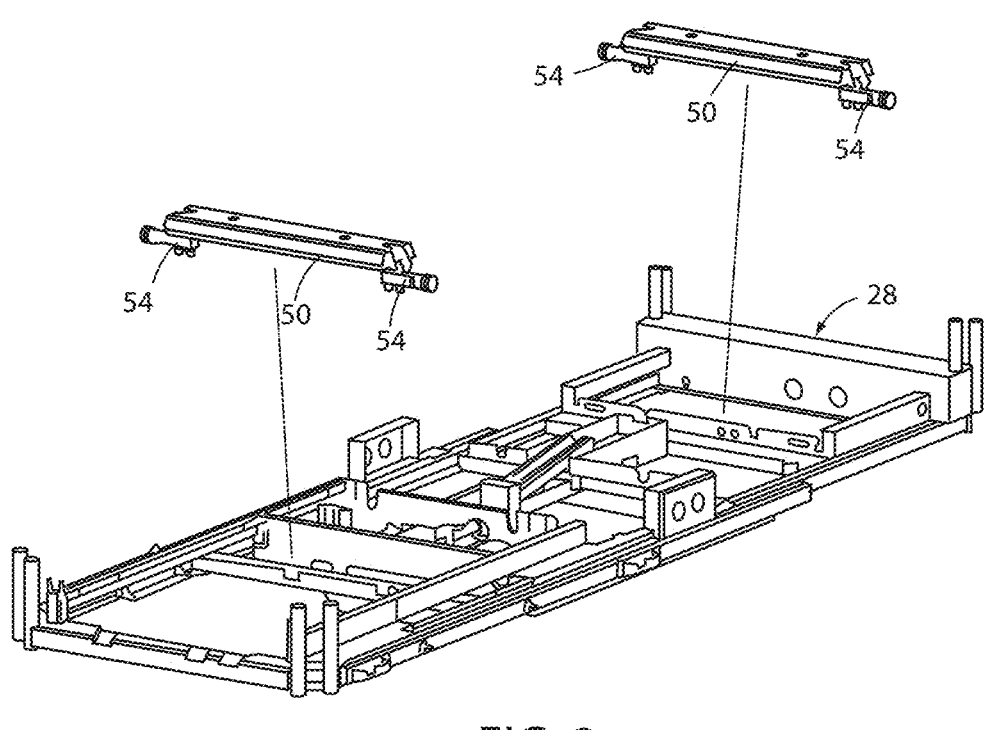
FIG. 2 is a perspective view of a litter frame and a pair of lift header assemblies of the patient support apparatus.

FIG. 2 illustrates in greater detail litter frame 28 separated from lifts 26 and base 22. Litter frame 28 is also shown in FIG. 2 with support deck 30 removed. Litter frame 28 is supported by two lift header assemblies 50. A first one of the lift header assemblies 50 is coupled to a top 52 (FIG. 3) of a first one of the lifts 26, and a second one of the lift header assemblies 50 is coupled to the top 52 of the second one of the lifts 26. Each lift header assembly 50 includes a pair of force sensors 54, which will be described herein as being load cells, but it will be understood that force sensors 54 may be other types of force sensors besides load cells. The illustrated embodiment of patient support apparatus 20 includes a total of four load cells 54, although it will be understood by those skilled in the art that different numbers of load cells may be used in accordance with the principles of the present disclosure. Load cells 54 are configured to support litter frame 28. More specifically, load cells 54 are configured such that they provide complete and exclusive mechanical support for litter frame 28 and all of the components that are supported on litter frame 28 (e.g. support deck 30, footboard 32, side rails 34, etc.). Because of this construction, load cells 54 are adapted to detect the weight of not only those components of patient support apparatus 20 that are supported by litter frame 28 (including litter frame 28 itself), but also any objects or persons who are wholly or partially being supported by support deck 30.

Figure 3:
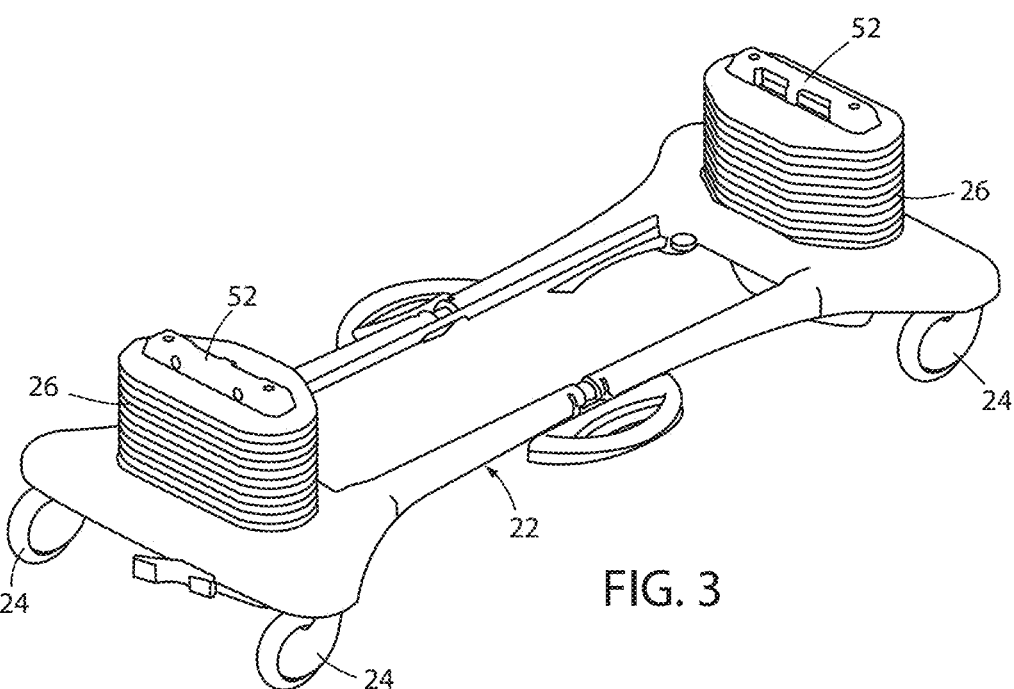
FIG. 3 is a perspective view of a base and a pair of lifts of the patient support apparatus.

The mechanical construction of patient support apparatus 20, as shown in FIGS. 1-3, is the same as, or nearly the same as, the mechanical construction of the Model 3002 S3 bed manufactured and sold by Stryker Corporation of Kalamazoo, Michigan. This mechanical construction is described in greater detail in the Stryker Maintenance Manual for the MedSurg Bed, Model 3002 S3, published in 2010 by Stryker Corporation of Kalamazoo, Michigan, the complete disclosure of which is incorporated herein by reference. It will be understood by those skilled in the art that patient support apparatus 20 can be designed with other types of mechanical constructions, such as, but not limited to, those described in commonly assigned, U.S. Pat. No. 7,690,059 issued to Lemire et al., and entitled HOSPITAL BED; commonly assigned U.S. Pat. Publication No. 2007/0163045 filed by Becker et al. and entitled PATIENT HANDLING DEVICE INCLUDING LOCAL STATUS INDICATION, ONE-TOUCH FOWLER ANGLE ADJUSTMENT, AND POWER-ON ALARM CONFIGURATION; and/or commonly assigned, U.S. Pat. No. 10,130,536 to Roussy et al., entitled PATIENT SUPPORT USABLE WITH BARIATRIC PATIENTS, the complete disclosures of all of which are also hereby incorporated herein by reference. The mechanical construction of patient support apparatus 20 may also take on forms different from what is disclosed in the aforementioned references.

Load cells 54 are part of an exit detection system 56 (FIG. 7) that, when armed, issues an alert when the patient exits from patient support apparatus 20. Exit detection system 56 is adapted to be armed via control panel 48a. After being armed, exit detection system 56 determines when an occupant of patient support apparatus 20 has left, or is likely to leave, patient support apparatus 20, and issues an alert and/or notification to appropriate personnel so that proper steps can be taken in response to the occupant's departure (or imminent departure) in a timely fashion. In at least one embodiment, exit detection system 56 monitors the center of gravity of the patient using the system and method disclosed in commonly assigned U.S. Pat. No. 5,276,432 issued to Travis and entitled PATIENT EXIT DETECTION MECHANISM FOR HOSPITAL BED, the complete disclosure of which is incorporated herein by reference. In other embodiments, exit detection system 56 determines if the occupant is about to exit, or already has exited, from patient support apparatus 20 by determining a distribution of the weights detected by each load cell 54 and comparing the detected weight distribution to one or more thresholds. In such embodiments, the center of gravity may or may not be explicitly calculated.

Other manners for functioning as an exit detection system are also possible. These include, but are not limited to, any of the manners disclosed in the following commonly assigned patent applications: U.S. patent application Ser. No. 14/873,734 filed Oct. 2, 2015, by inventors Marko Kostic et al. and entitled PERSON SUPPORT APPARATUS WITH MOTION MONITORING; U.S. patent publication 2016/0022218 filed Mar. 13, 2014, by inventors Michael Hayes et al. and entitled PATIENT SUPPORT APPARATUS WITH PATIENT INFORMATION SENSORS; and U.S. patent application Ser. No. 15/266,575 filed Sep. 15, 2016, by inventors Anuj Sidhu et al. and entitled PERSON SUPPORT APPARATUSES WITH EXIT DETECTION SYSTEMS, the complete disclosures of all of which are incorporated herein by reference. Further, in some embodiments, load cells 54 may be part of both an exit detection system and a scale system that measures the weight of a patient supported on support deck 30. The outputs from the load cells 54 are processed, in some embodiments, in any of the manners disclosed in commonly assigned U.S. patent application Ser. No. 62/428,834 filed Dec. 1, 2016, by inventors Marko Kostic et al. and entitled PERSON SUPPORT APPARATUSES WITH LOAD CELLS, the complete disclosure of which is incorporated herein by reference.

Figure 4:
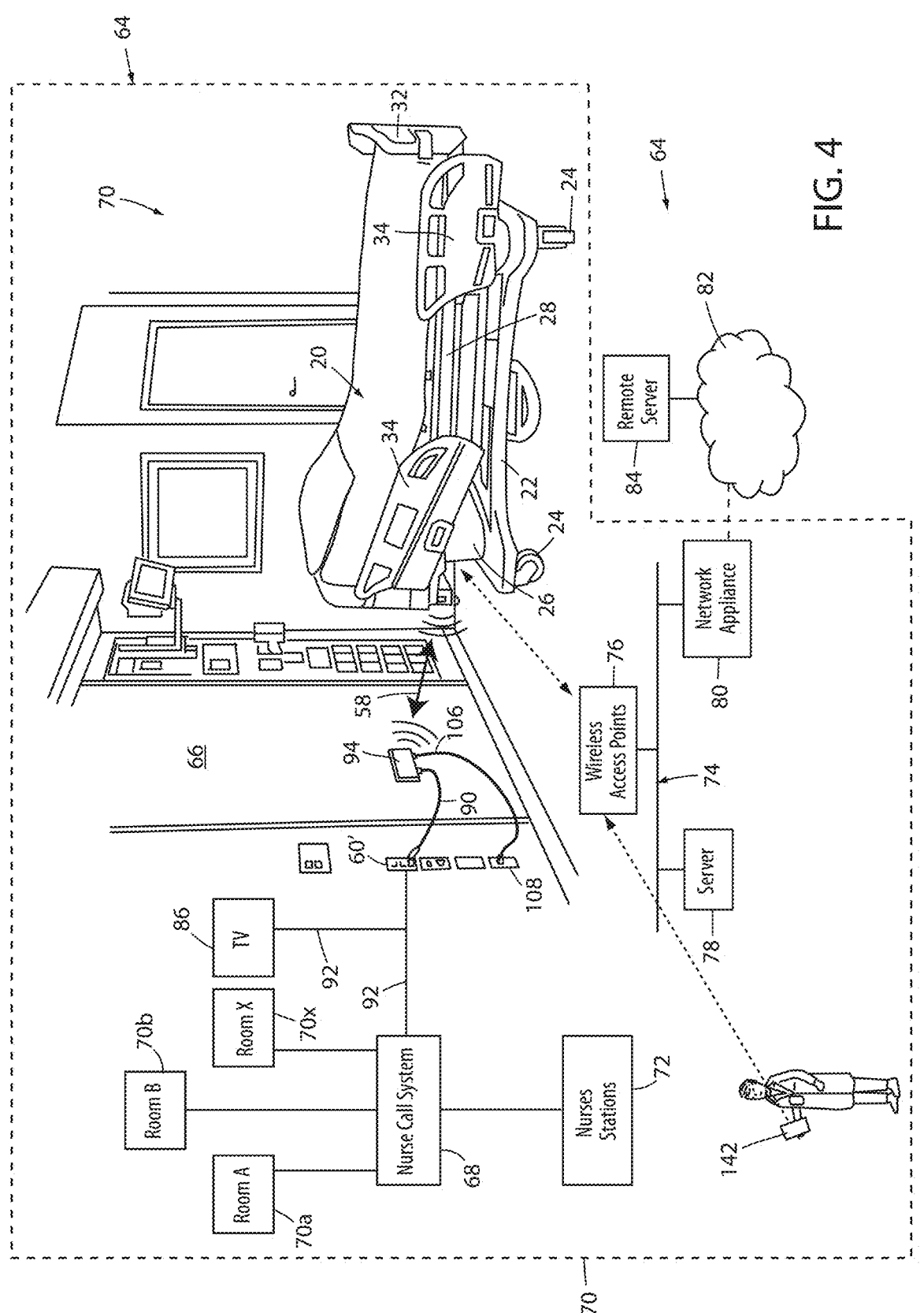
FIG. 4 is a diagram of the patient support apparatus, a newer generation headwall unit, and a wireless communication link between the patient support apparatus and a wall outlet of a nurse call system.

Regardless of how implemented, patient support apparatus 20 is adapted to communicate an alert when the exit detection system is armed and detects that a patient is about to, or has, exited. One manner in which the alert is communicated to a conventional nurse call system 68 is shown in FIG. 4. Patient support apparatus 20 communicates with a nurse call system 68, and vice versa, through a communication link 58 that is established between patient support apparatus 20 and a conventional nurse call wall outlet 60. This communication link 58 may be a wired communication link or a wireless communication link. In addition to forwarding an exit detection alert over communication link 58 from patient support apparatus 20 to nurse call system 68, communication link 58 may be used for communicating a variety of other information.

One example of such information are the audio signals of the patient and a remotely positioned nurse. That is, a patient onboard patient support apparatus 20 is able to communicate with a remotely positioned nurse by speaking into a microphone onboard patient support apparatus 20, and patient support apparatus 20 forwards these audio signals to a remotely positioned nurse by transmitting them over communication link 58 to wall outlet 60, which is in communication with nurse call system 68, as will be discussed in greater detail below. Similarly, a remotely positioned nurse is able to speak into a microphone coupled to the nurse call system and have his/her voice signals forwarded to wall outlet 60, which are then transmitted over communication link 58 to a speaker onboard patient support apparatus 20.

FIG. 4 illustrates additional details of a typical healthcare facility 64. As shown therein, healthcare facility 64 includes a headwall 66, nurse call system 68, a plurality of rooms 70 (70a, 70b . . . 70x), one or more nurses' stations 72, a local area network 74, one or more wireless access points 76, a patient support apparatus server 78, and one or more network appliances 80 that couple LAN 74 to the internet 82, thereby enabling server 78 and other applications on LAN 74 to communicate with computers outside of healthcare facility 64, such as, but not limited to, a geographically remote server 84. Wall outlet 60 is typically electrically coupled by one or more conductors 92 to a television 86 and one or more room devices (e.g. reading light, room light, etc.). It will be understood by those skilled in the art, however, that the healthcare facility infrastructure shown in FIG. 4 may vary widely from healthcare facility to healthcare facility.

For example, patient support apparatus 20 may be used in healthcare facilities having no wireless access points 76, no connection to the internet 82 (e.g. no network appliances 80), and/or no patient support apparatus server 78. Still further, local area network 74 may include other and/or additional servers installed thereon, and/or room 70, in some healthcare facilities 64, may be a semi-private room having multiple patient support apparatuses 20 and multiple wall outlets 60. Still other variations are possible. It will therefore be understood that the particular healthcare facility infrastructure shown in FIG. 4 is merely illustrative, and that patient support apparatus 20 is constructed to be communicatively coupled to healthcare facility communication infrastructures which are arranged differently from that of FIG. 4, some of which are discussed in greater detail below.

As is shown in FIG. 4, patient support apparatus 20 is adapted to be communicatively coupled to the wall outlet 60 on headwall 66 by way of a wireless communication link 58 that wirelessly couples patient support apparatus 20 to a wireless headwall unit 94. Wireless headwall unit 94, in turn, is coupled by way of a cable 90 to wall outlet 60. Wireless headwall unit 94 and patient support apparatus 20 are able to communicate wirelessly with each other in a bidirectional fashion. That is, messages can be wirelessly sent from patient support apparatus 20 to headwall unit 94, and messages can be wirelessly sent from headwall unit 94 to patient support apparatus 20.

Although not shown in FIG. 4, patient support apparatus 20 may further be configured to be able to communicate with wall outlet 60 via a wired communication link 58, if desired. When such a wired communications link 58 is desired, a nurse call cable 90 is connected directly from patient support apparatus 20 to wall outlet 60. Unless wall outlet 60 has room for two cable plugs, the end of cable 90 shown in FIG. 4 that is plugged into wall outlet 60 is removed in order to allow the cable from patient support apparatus 20 to be inserted therein. Alternatively, the end of the cable 90 shown in FIG. 4 that is plugged into headwall unit 94 may be removed and plugged into patient support apparatus 20. However attained, once a cable 90 is coupled between patient support apparatus 20 and wall outlet 60, a wired communication link 58 is established (see FIG. 6).

Wall outlet 60 is coupled to one or conductors 92 that electrically couple the wall outlet 60 to nurse call system 68 and to one or more other devices, such as television 86. Conductors 92 are typically located behind headwall 66 and not visible. In some healthcare facilities, conductors 92 may first couple to a room interface board that includes one or more electrical connections electrically coupling the room interface board to television 86 and/or nurse call system 68. Still other communicative arrangements for coupling wall outlet 60 to nurse call system 68 and television 86 are possible.

Communication link 58 (FIG. 4) enables patient support apparatus 20 to communicate with nurse call system 68 and/or television 86. A patient supported on patient support apparatus 20 who activates a nurse call control on patient support apparatus 20 causes a signal to be conveyed via communication link 58 to the nurse call system 68, which then sends a notification to one or more remotely located nurses (e.g. nurses at one of the nurses' stations 72). If the patient uses a TV control positioned on one of the control panels (e.g. control panel 48c) to change a channel or change the volume of television 86, the control conveys a signal along link 58 to the wall outlet 60, and the signal is thereafter passed from outlet 60 to television 86.

As will be discussed in greater detail below, outlet 60 often includes a plurality of pins (e.g. 37 pins), and the audio signals that are passed between the patient and a remotely positioned nurse are transmitted over a separate set of pins than the control signals used to control television 86. Additional pins are used for communicating other information between patient support apparatus 20 and nurse call system 68 and/or other devices positioned within room 70 (e.g. television 86).

Figure 5:
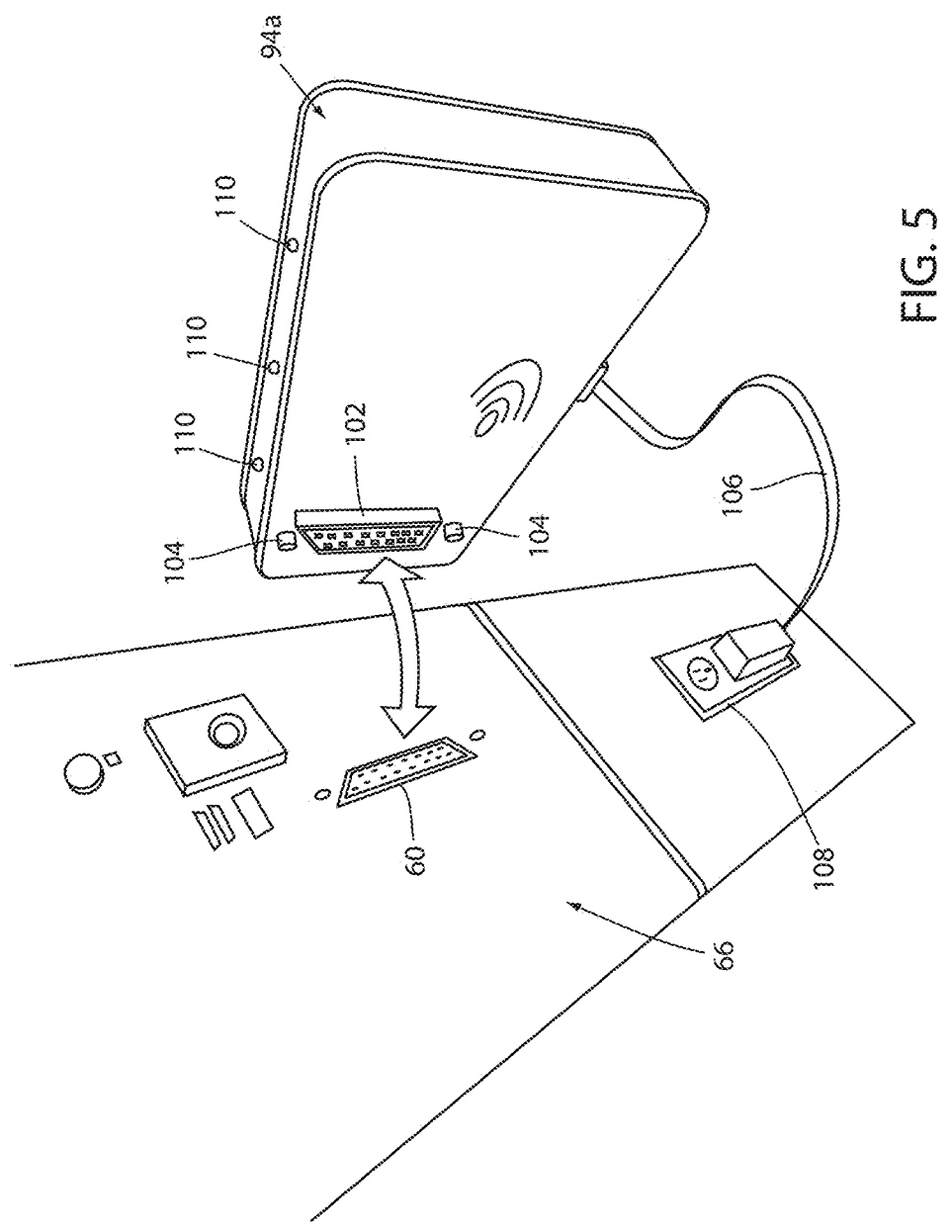
FIG. 5 is a diagram of an alternative newer generation headwall unit.

FIG. 5 illustrates an alternative embodiment of a headwall unit 94a according to another embodiment of the present disclosure. Headwall unit 94a differs from headwall unit 94 in that, rather than including a connector for a cable 90, it is adapted to plug directly into wall outlet 60 via a connector 102. Connector 102 is thus shaped and dimensioned to be frictionally maintained in an electrically coupled state to outlet 60, and to support the entire headwall unit 94a. One or more alignment posts 104 may be included with connector 102 in order to more securely retain headwall unit 94*a* to wall outlet 60, if desired. Connector 102 may be the same as, or nearly the same as, an end of a cable 90, thereby allowing either a cable from headwall unit 94, or connector 102 from headwall unit 94*a*, to be inserted into wall outlet 60.

In the embodiment shown in FIG. 5, connector 102 is a 37 pin connector that includes 37 pins adapted to be inserted into 37 mating sockets of wall outlet 60. Such 37 pin connections are one of the most common types of connectors found on existing headwalls of medical facilities for making connections to the nurse call system 68. Such 37 pin connectors, however, are not the only type of connectors, and it will be understood that headwall unit 94*a* can utilize different types of connectors 102 (whether integrated therein or attached to a cable) that are adapted to electrically couple to different types of nurse call outlets 60. One example of such an alternative wall outlet 60 and cable is disclosed in commonly assigned U.S. patent application Ser. No. 14/819, 844 filed Aug. 6, 2015, by inventors Krishna Bhimavarapu et al. and entitled PATIENT SUPPORT APPARATUSES WITH WIRELESS HEADWALL COMMUNICATION, the complete disclosure of which is incorporated herein by reference. Still other types of wall outlets 60 and corresponding cable connectors 102 may be utilized.

Other than the absence of a connector for a cable 90, headwall unit 94*a* may be the same as headwall unit 94, and the following description of headwall unit 94 will apply equally to both headwall unit 94 and headwall unit 94*a*. Headwall unit 94 of FIG. 4 (and headwall unit 94*a* of FIG. 5) include a power cable 106 having an end adapted to be inserted into a conventional electrical outlet 108. Power cable 106 enables headwall unit 94 to receive power from the mains electrical supply via outlet 108. It will be appreciated that, in some embodiments, headwall unit 94 is battery operated and cable 106 may be omitted. In still other embodiments, headwall unit 94 may be both battery operated and include cable 106 so that in the event of a power failure, battery power supplies power to headwall unit 94, and/or in the event of a battery failure, electrical power is received through outlet 108.

Headwall unit 94 may also include a plurality of status lights 110, such as are shown in FIG. 5. Status lights 110 provide visual indications about one or more aspects of headwall unit 94. For example, in some embodiments, the illumination of one of status lights 110 indicates that headwall unit 94 is in successful communication with nurse call system 68 and/or patient support apparatus 20. The illumination of one or more additional status lights 110 may also or alternatively indicate that power is being supplied to headwall unit 94 and/or the status of a battery included within headwall unit 94. Still further, in some embodiments, one or more of status lights 110 may be illuminated depending upon whether a nurse is talking to the patient, or vice versa.

Headwall unit 94 of FIG. 4 (and headwall unit 94*a* of FIG. 5) are adapted to wirelessly receive signals from patient support apparatus 20 and deliver the signals to wall outlet 60 in a manner that matches the way the signals would otherwise be delivered to wall outlet 60 if a conventional nurse call cable (e.g. cable 90) were connected between patient support apparatus 20 and wall outlet 60. In other words, patient support apparatus 20 and headwall unit 94 cooperate to provide signals to wall outlet 60 in a manner that is transparent to wall outlet 60 and nurse call system 68 such that these components cannot detect whether they are in communication with patient support apparatus 20 via wired or wireless communication. In this manner, a healthcare facility can utilize the wireless communication abilities of one or more patient support apparatuses 20 without having to make any changes to their existing wall outlet 60 or to their nurse call system 68.

In addition to sending signals received from patient support apparatus 20 to wall outlet 60, headwall unit 94 is also adapted to forward signals received from wall outlet 60 to patient support apparatus 20. Such bidirectional communication includes, but is not limited to, communicating audio signals between a person supported on patient support apparatus 20 and a nurse positioned remotely from patient support apparatus 20 (e.g. nurses' station 72). The audio signals received by headwall unit 94 from patient support apparatus 20 are forwarded to wall outlet 60, and the audio signals received by wall outlet 60 from nurse call system 68 are forwarded to one or more speakers onboard patient support apparatus 20.

Headwall unit 94 also communicates the data and signals it receives from patient support apparatus 20 to the appropriate pins of wall outlet 60. Likewise, it communicates the data and signals it receives and/or detects on the pins of wall outlet 60 to patient support apparatus 20 via wireless messages. The wireless messages include sufficient information for patient support apparatus 20 to discern what pins the messages originated from, or sufficient information for patient support apparatus 20 to decipher the information included in the message. In at least one embodiment, headwall unit 94 includes any and/or all of the same functionality as, and/or components of, the headwall units 76 disclosed in commonly assigned U.S. patent application Ser. No. 16/215, 911 filed Dec. 11, 2018, by inventors Alexander Bodurka et al. and entitled HOSPITAL HEADWALL COMMUNICATION SYSTEM, the complete disclosure of which is incorporated herein by reference. Alternatively, or additionally, headwall unit 94 may include any and/or all of the same functionality as, and/or components of, the headwall interface 38 disclosed in commonly assigned U.S. patent publication 2016/0038361 published Feb. 11, 2016, entitled PATIENT SUPPORT APPARATUSES WITH WIRELESS HEADWALL COMMUNICATION, and filed by inventors Krishna Bhimavarapu et al., the complete disclosure of which is also incorporated herein by reference. Still further, headwall unit 94 and/or patient support apparatus 20 may include any of the functionality and/or components of the headwall units 140, 140*a* and/or patient support apparatuses 20, 20*a*, and/or 20*b* disclosed in commonly assigned U.S. patent application Ser. No. 62/833,943 filed Apr. 15, 2019, by inventors Alexander Bodurka et al. and entitled PATIENT SUPPORT APPARATUSES WITH NURSE CALL AUDIO MANAGEMENT, the complete disclosure of which is incorporated herein by reference.

Figure 6:
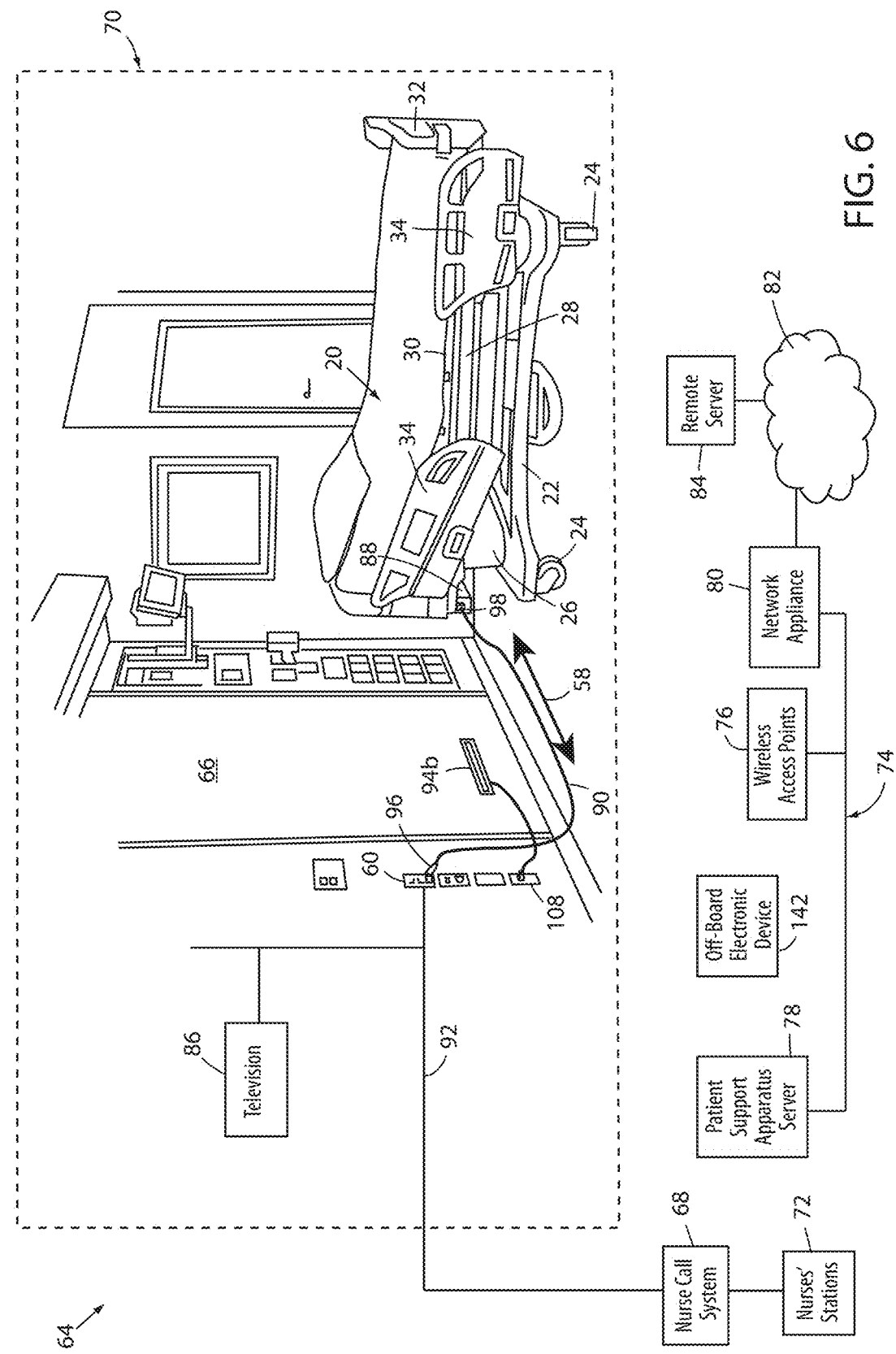
FIG. 6 is a diagram of the patient support apparatus, an older generation headwall unit, and a wired communication link between the patient support apparatus and a wall outlet of a nurse call system.

FIG. 6 illustrates an older generation headwall unit 94*b* that is adapted to send wireless location signals to patient support apparatus 20, but that is not adapted to act as a communication intermediary between wall outlet 60 and patient support apparatus 20 like headwall unit 94 is. Thus, in the example shown in FIG. 6, a wired communication link 58 is used to communicatively couple patient support apparatus 20 to wall outlet 60. Wired communication link 58 comprises a nurse call cable 90 connected directly from patient support apparatus 20 to wall outlet 60.

Figure 7:
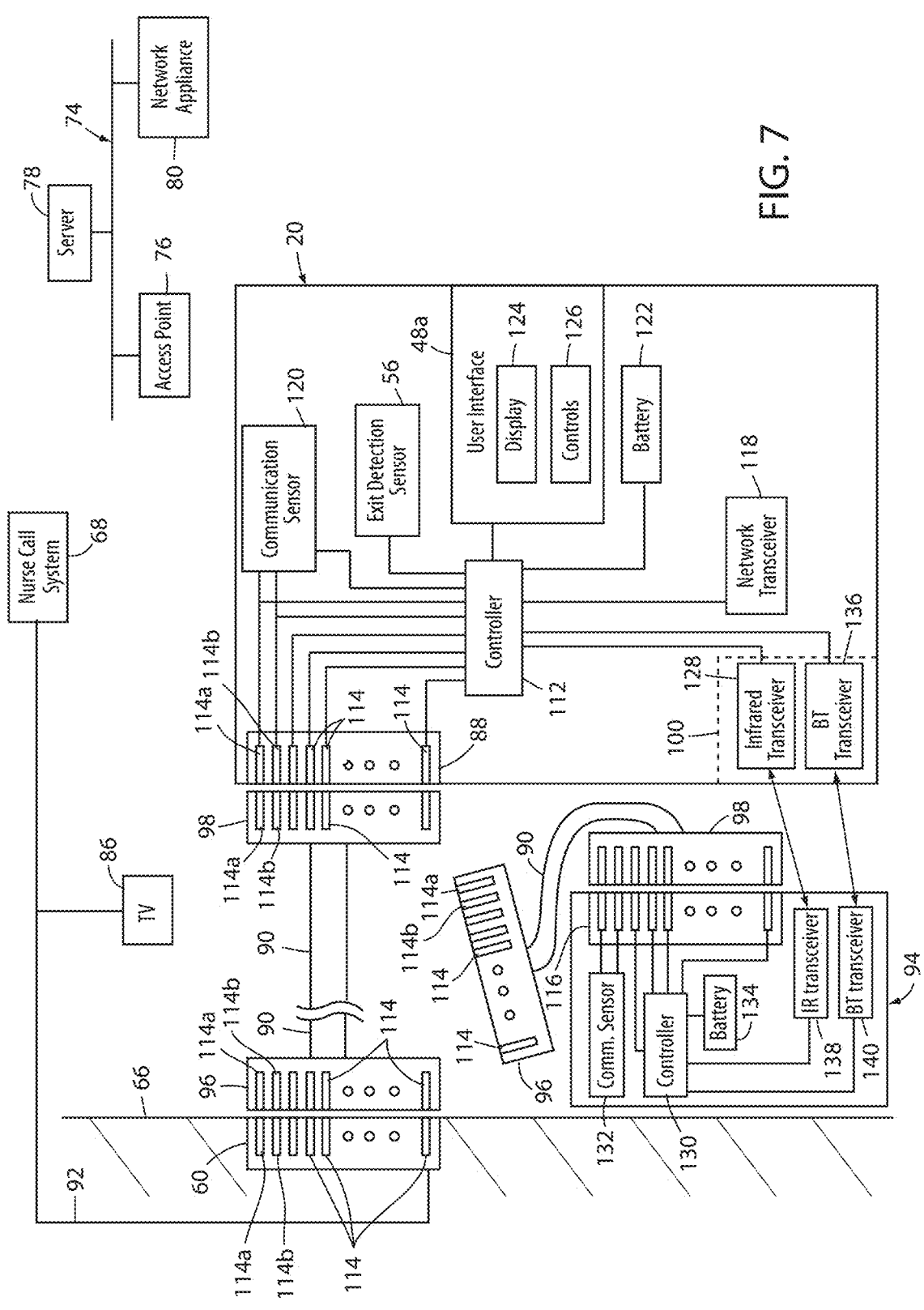
FIG. 7 is a block diagram of several of the structures of FIG. 4 showing some of the internal components of a wireless headwall unit and the patient support apparatus.
Figure 16:
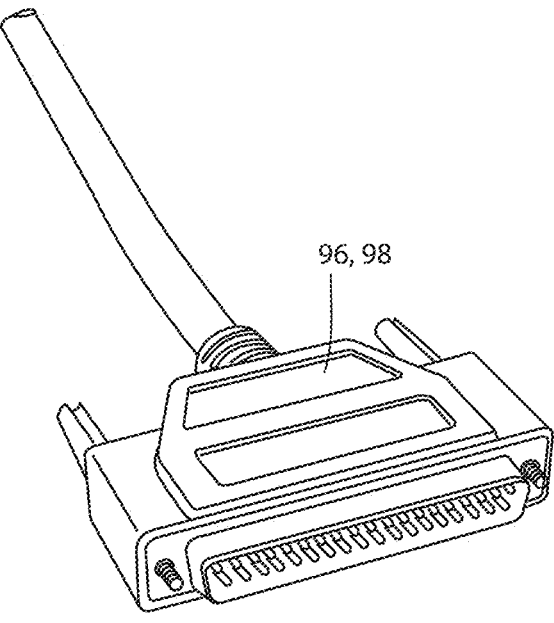
FIG. 16 is a perspective view of a prior art 37-pin male cable connector.
Figure 17:
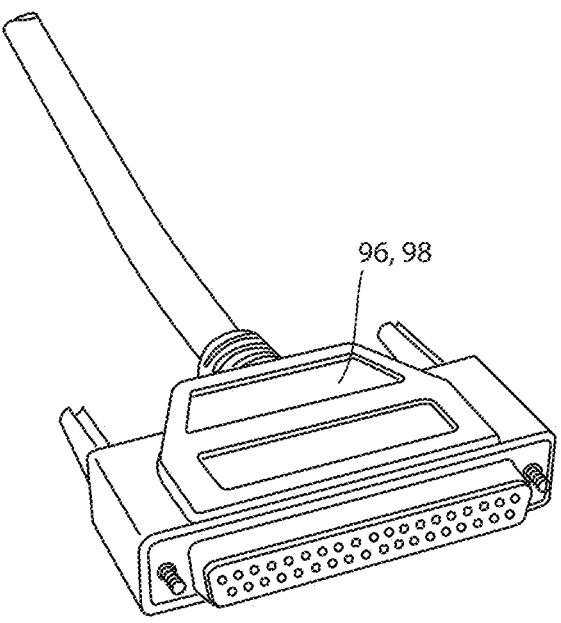
FIG. 17 is a perspective view of a prior art 37-pin female cable connector.

Cable 90 includes a first end having a first connector 96 and a second end having a second connector 98 (FIG. 6). First connector 96 is adapted to be plugged into wall outlet 60. Second connector 98 is adapted to be plugged into a cable interface 88 positioned on patient support apparatus 20 (FIG. 7). In many healthcare facilities 64, wall outlet 60 is configured as a 37-pin receptacle. In such facilities, cable 90 includes first and second connectors 96 and 98 having 37 pins (one of which may be a male connector and the other of which may be a female connector, although other combinations may be used). One example of a male 37-pin connector 96, 98 that may be used as first or second connector 96 or 98 is shown in FIG. 16. One example of a female 37-pin connector 96, 98 that may be used as first or second connector 96 or 98 is shown in FIG. 17. Other types of 37-pin connectors may also be used, depending upon the configuration of wall outlet 60. Still further, in some healthcare environments, wall outlet 60 includes fewer pins and/or has an arrangement of pins that is shaped to match a cable 90 having connectors different from what is shown in FIGS. 16 and 17. Patient support apparatus 20 and headwall unit 94 are adapted to communicate with all of these different types of wall outlets 60 via an appropriately selected cable (e.g. one with the proper connectors 96, 98 on its ends).

In the example of FIG. 6, patient support apparatus 20 may have dual communication capabilities. That is, it may be able to communicate via either a wired communication link 58 or a wireless communication link 58 with outlet 60. Alternatively, patient support apparatus 20 may be configured to communicate with outlet 60 only by a wired communication link 58. In either case, patient support apparatus 20 may be configured with wired or wireless network communication abilities that enable it to communicate with access point 76 of computer network 74 (and patient support apparatus server 78).

FIG. 7 illustrates further details regarding the manner in which patient support apparatus 20 communicates with wall outlet 60, and vice versa, as well as the structures involved with that communication. As shown therein, patient support apparatus 20 includes cable interface 88, a wireless interface 100, a controller 112, a network transceiver 118, a communication sensor 120, exit detection system 56, a battery 122, and one or more control panels 48 (only control panel 48a is shown in FIG. 7, but it will be understood that the functions discussed below with respect to control panel 48a may be implemented on other ones of the control panels 48b and/or 48c).

Cable interface 88 is adapted to electrically couple to the plurality of pins 114 of cable connector 98. It will be understood that, although FIG. 7 shows a plurality of pins 114 for each of connectors 96 and 98 of cables 90, wall outlet 60, cable interface 88 of patient support apparatus 20, and a cable interface 116 of headwall unit 94, one or more of these devices (cable connectors 96, 98, cable interfaces 88, 116, and wall outlet 60) will include pin receptacles instead of pins. Such pin receptacles are adapted to receive and electrically couple to pins 114. Further, it will be understood that it does not matter which of these devices include pins and which includes pin receptacles so long as each connection between the devices include a combination of pins and pin receptacles that allow communication between the mated devices. Consequently, the term "pins" as used herein will refer to pins and/or pin receptacles.

In some embodiments, controller 112 is implemented as, and/or includes, one or more conventional microcontrollers. In other embodiments, controller 112 may be modified to use a variety of other types of circuits-either alone or in combination with one or more microcontrollers-such as, but not limited to, any one or more microprocessors, field programmable gate arrays, systems on a chip, volatile or nonvolatile memory, discrete circuitry, and/or other hardware, software, or firmware that is capable of carrying out the functions described herein, as would be known to one of ordinary skill in the art. Such components can be physically configured in any suitable manner, such as by mounting them to one or more circuit boards, or arranging them in other manners, whether combined into a single unit or distributed across multiple units. The instructions followed by the microcontroller (if included) when carrying out the functions described herein, as well as the data necessary for carrying out these functions, are stored in a memory (not shown) that is accessible to controller 112.

It will be understood that wall outlet 60, cables 90, and cable interfaces 88 and 116 are all illustrated in FIG. 7 as having only six pins. This is done merely for purposes of compact illustration. All of these components typically include 37 pins, although there are other wall outlets that may be present in different healthcare facilities having different pin numbers and the principles of the present disclosure can be applied in healthcare facilities having these types of wall outlets as well. The pins that are not shown in FIG. 7 are used by other components of patient support apparatus 20 for other purposes. For example, one pin may be used to convey information to wall outlet 60 (and a structure coupled to conductor 92) indicating whether the patient has pressed a control on patient support apparatus 20 to turn on or turn off a light in the particular room in which patient support apparatus 20 is located. Another pin may communicate the status of a component onboard patient support apparatus 20, such as, but not limited to whether one or more side rails 34 are in a down position (or an up position); whether the position of any of the side rails 34 changes from an initial state; whether a brake on patient support apparatus 20 is set; whether the exit detection system is armed; whether support deck 30 is at its lowest height; whether head section 40 has pivoted to less than a threshold angle (e.g. 30 degrees); and whether patient support apparatus 20 has been set or not to monitor a particular set of conditions. These various items of data are detected by one or more corresponding sensors onboard patient support apparatus 20 that are in communication with controller 112. Still others of the additional pins may be used for still other purposes.

Although FIG. 7 illustrates a number of the pins 114 of cable interface 88 being fed directly to controller 112, it will be understood that this is done merely for purposes of illustrative convenience, and that one or more of these pins 114 may be fed to one or more intermediary structures before being fed to controller 112. Such intermediary structures may include, but are not limited to, one or more relays and/or switches whose states are controlled by controller 112. Additionally, some pins may not be coupled to controller 112, but may be routed to other structures within patient support apparatus 20.

It will also be understood that, although FIG. 7 illustrates two cables 90—one extending from patient support apparatus 20 to outlet 60 and another one extending from headwall unit 94 to a free end, in actual usage within a particular room within a healthcare facility, only a single cable 90 will be used at any given time. Thus, patient support apparatus 20 will either be coupled to outlet 60 by a cable 90, or headwall unit 94 will be coupled to outlet 60 by a cable 90. In the former case, communication link 58 is a wired communication link, and in the latter case, communication link 58 is wireless.

Battery 122 supplies electrical power to patient support apparatus 20 when its power cord (not shown) is not plugged into an external source of electrical energy (e.g. electrical outlet 108 of FIG. 4). Controller 112, either alone or in combination with other circuitry, is adapted to monitor a charge state of battery 122 and/or to monitor one or more other characteristics of battery 122. As will be discussed in greater detail below, controller 112 is adapted to issue an alert if battery 122 drops below a particular charge threshold while patient support apparatus 20 is not coupled to an external source of electrical power.

Controller 112 communicates with communication sensor 120, exit detection system 56, control panel 48a, network transceiver 118, battery 122, cable interface 88, and wireless interface 100. Controller 112 uses wireless interface 100 to communicate wirelessly with headwall unit 94, and it uses cable interface 88 to communicate with wall outlet 60 via cable 90. That is, controller 112 uses wireless interface 100 when it is utilizing a wireless communication link 58, and it uses cable interface 88 when it is utilizing a wired communication link 58.

In some embodiments, control panel 48a includes a display 124 (FIG. 7) and a plurality of controls 126. In some embodiments, the display 124 may take on the form and/or functionality of the display 64a disclosed in commonly assigned U.S. patent application Ser. No. 62/864,638 filed Jun. 21, 2019, by inventors Kurosh Nahavandi et al. and entitled PATIENT SUPPORT APPARATUS WITH CAREGIVER REMINDERS, the complete disclosure of which is incorporated herein by reference. Still other types of displays may also be used. Control panel 48a may also include a dashboard of the type disclosed in the aforementioned patent application. Still further, patient support apparatus 20 may be configured to issue any of the reminders in any of the manners disclosed in the aforementioned '638 patent application. Other types of control panels 48a, however, may alternatively be used.

Communication sensor 120 (FIG. 7) is adapted to detect when cable interface 88 is in communication with wall outlet 60 via a cable 90. In one embodiment, communication sensor 120 detects the presence of a cable 90 connected between interface 88 and wall outlet 60 by monitoring the voltage, if any, on at least two pins 114a and 114b of cable interface 88. In some embodiments, the two pins are what is commonly referred to as the Nurse Call Plus (+) pin and what is commonly referred to as the Priority Normally Open/Normally Closed (NO/NC) pin. FIG. 18 illustrates a typical arrangement and identification of the pins for a common 37-pin connector. As can be seen therein, pin twenty-five corresponds to the Nurse Call Plus (+) pin, and pin thirty corresponds to the Priority Normally Open/Normally Closed pin. Accordingly, when communication sensor 120 is coupled to a cable interface 88 having the pin arrangement shown in FIG. 18, communication sensor 120 detects the voltage, if any, on both pins twenty-five and thirty, which correspond to pins 114a and 114b of FIG. 6. This voltage is generated by the nurse call system 68 and delivered to corresponding pins in wall outlet 60 (which in turn are delivered to pins 114a and 114b of interface 88 if a cable 90 is connected from wall outlet 60 to patient support apparatus 20.) If communication sensor 120 detects a voltage on one or both of these pins, it forwards a message to controller 112 indicating that a wired communication link 58 is currently established between patient support apparatus 20 and wall outlet 60 via a cable 90. If no voltage is detected on either of these pins, communication sensor 120 forwards a message to controller 112 indicating that no wired communication link 58 has been established between patient support apparatus 20 and wall outlet 60.

Communication sensor 120 monitors the voltage on the two pins 114a and 114b because it has been found that most manufacturers of nurse call systems 68 will generate a voltage on either or both of these pins of their respective wall outlet 60. Such voltage typically, although not necessarily always, ranges from about five to twenty-seven volts. Communication sensor 120, in at least one embodiment, is constructed to detect any voltage that is greater than about 0.3 volts (positive or negative), although it will be understood that this threshold detection level may be changed. If a voltage of about 0.3 volts or greater is detected on either pin 114a or pin 114b, or on both of them, communication sensor 120 concludes that a wired communication link 58 currently exists between patient support apparatus 20 and wall outlet 60 (and thus nurse call system 68), and sends a message to controller 112 indicating the existence of this wired communication link 58, as mentioned. If no voltage of about 0.3 volts or greater is detected on either of pins 114a or 114b, communication sensor 120 concludes that this wired communication link 58 is not present and forwards a message indicating such to controller 112.

In the embodiment shown in FIG. 7, patient support apparatus 20 is also configured to communicate with wall outlet 60 in a wireless manner (e.g. without cable 90). This can be seen from the presence of wireless interface 100 on patient support apparatus 20, and more specifically from the inclusion of radio frequency transceiver 136 within wireless interface 100. Wireless interface 100 also includes an infrared transceiver 128. As will be discussed in greater detail below, wireless interface 100 is used to establish a wireless communication link 58 with wall outlet 60 by wirelessly communicating with an adjacent headwall unit 94 that is coupled by a cable 90 to wall outlet 60.

FIG. 7 illustrates several internal components of headwall unit 94. These components includes cable interface 116, a controller 130, a communication sensor 132, a battery 134, an infrared (IR) transceiver 138, and a Bluetooth transceiver 140. IR transceiver 138 of wireless headwall unit 94 is adapted to communicate using infrared signals with IR transceiver 128 of patient support apparatus 20. Bluetooth transceiver 140 of wireless headwall unit 94 is adapted to communicate using Bluetooth communications with Bluetooth transceiver 136 of patient support apparatus 20.

Controller 130 communicates with communication sensor 132, transceivers 138 and 140, as well as with additional electronics that are present on headwall unit 94. The additional electronics may include any of the electronics disclosed in any of the following commonly assigned patent applications, and wireless headwall unit 94 may be configured to perform any of the functions disclosed in the following commonly assigned patent applications: Ser. No. 16/215,911 filed Dec. 11, 2018, by inventors Alexander Bodurka et al. and entitled HOSPITAL HEADWALL COMMUNICATION SYSTEM; Ser. No. 16/217,203 filed Dec. 12, 2018, by inventor Alexander Bodurka, and entitled SMART HOSPITAL HEADWALL SYSTEM; and Ser. No. 16/193,150 filed Nov. 16, 2018, by inventors Alexander Bodurka et al. and entitled PATIENT SUPPORT APPARATUSES WITH LOCATION/MOVEMENT DETECTION, the complete disclosures of all of which are incorporated herein by reference.

Wireless headwall unit 94 is coupled to a wall outlet 60 by way of cable 90 having a connector 96 that is adapted to be inserted into wall outlet 60. As was noted, in some embodiments, such as wireless headwall unit 94a of FIG. 5, cable 90 may be omitted and wireless headwall unit 94a may be inserted directly into wall outlet 60 by way of a connector 102. Further, as was noted previously, although FIG. 7 illustrates both a cable 90 coupling patient support apparatus 20 to wall outlet 60 and a cable 90 extending from headwall unit 94 to a free end, a typical room (or bay of a room) in a healthcare facility will only include a single cable 90 that, depending upon the presence or absence of headwall unit 94, will extend between patient support apparatus 20 and wall outlet 60, or between headwall unit 94 and wall outlet 60. Thus, the two different cables 90 of FIG. 7 illustrate two different options for setting up communications link 58 in a wired fashion or in a wireless fashion.

Cable interface 116 of headwall unit 94 (FIG. 7) communicates with cable 90 in the same manners as cable interface 88 of patient support apparatus 20. That is, the signals on the various pins of 114 of wall outlet 60 are communicated to controller 130 via cable 90 and cable interface 116, and controller 130 is adapted to forward those signals to wireless interface 100 of patient support apparatus 20 using transceivers 138 and/or 140. Likewise, wireless headwall unit 94 is adapted to receive data from patient support apparatus 20 via one or both of transceivers 138 and/or 140 and to forward the received data, as appropriate, to corresponding pins 114 of connector 98 of cable 90 (which are forwarded to wall outlet 60 when the opposite end (connector 96) of cable 90 is inserted in wall outlet 60).

Infrared transceiver 138 of headwall unit 94 acts as a location transceiver. Infrared transceiver 138 is a short range transceiver that emits a short range signal containing an identifier that is unique to that particular wireless headwall unit. Infrared transceiver 128 of patient support apparatus 20 is able to detect the short range signal from infrared transceiver 138 when the patient support apparatus 20 is positioned adjacent to headwall unit 94 (e.g. within approximately a meter or two). Patient support apparatus 20 forwards this unique signal to an off board server, such as server 78 and/or remote server 84, which contains a table correlating the unique identifiers of each headwall unit 94 to their location within the healthcare facility. This table is generated during a survey of the headwall units 94 when they are initially installed within the healthcare facility. Server 78 is therefore able to determine the location of each patient support apparatus 20 within the healthcare facility whenever the patient support apparatus 20 is positioned adjacent a headwall unit 94. Further explanation of one manner in which transceivers 128, 136, 138, and 140 may operate are provided in the following commonly assigned U.S. patent applications: Ser. No. 16/215,911 filed Dec. 11, 2018, by inventors Alexander Bodurka et al. and entitled HOSPITAL HEADWALL COMMUNICATION SYSTEM; Ser. No. 16/217,203 filed Dec. 12, 2018, by inventor Alexander Bodurka, and entitled SMART HOSPITAL HEADWALL SYSTEM; and Ser. No. 16/193,150 filed Nov. 16, 2018, by inventors Alexander Bodurka et al. and entitled PATIENT SUPPORT APPARATUSES WITH LOCATION/MOVEMENT DETECTION, the complete disclosures of all of which are incorporated herein by reference.

Bluetooth transceivers 136 and 140 are used by controllers 112 and 130, respectively, to transmit audio signals between patient support apparatus 20 and wireless headwall unit 94, such as, but not limited to, the audio signals used to convey the voice signals of the patient and the remotely positioned nurse. Such audio signals may also include the audio signals from television 86 and/or a radio or other entertainment device positioned in the room 70. Bluetooth transceivers 136 and 140 may also be used to transmit other data, such as, but not limited to, status data regarding the status of patient support apparatus 20, one or more messages indicating an exit detection alert has been issued, and/or other data. In some embodiments, wireless headwall unit 94 and patient support apparatus 20 are configured to exchange audio signals therebetween in any of the manners disclosed in commonly assigned U.S. patent application Ser. No. 62/833,943 filed Apr. 15, 2019, by inventors Alexander Bodurka et al. and entitled PATIENT SUPPORT APPARATUSES WITH NURSE CALL AUDIO MANAGEMENT, the complete disclosure of which is incorporated herein by reference.

In many embodiments, infrared transceivers 128 and 138 are used to initially establish the Bluetooth communication link between patient support apparatus 20. In such embodiments, transceivers 128 and 138 may exchange a unique patient support apparatus ID and a unique wireless headwall unit ID. These IDs are then used as addresses for the wireless communication between patient support apparatus 20 and wireless headwall unit 94. Such addresses ensure that patient support apparatus 20 only establishes a wireless communication link 58 with a headwall unit 94 that is positioned adjacent to the patient support apparatus 20, even when other wireless headwall units 94 may be within range of Bluetooth transceiver 136. In other words, patient support apparatus 20 only establishes a wireless communication link 58 with the headwall unit 94 that its IR transceiver 128 has linked to, and due to IR transceiver 138's limited range, this only happens when patient support apparatus 20 is positioned adjacent to headwall unit 94. Still other ways of communicating between patient support apparatus 20 and wireless headwall unit 94 may be utilized.

Communication sensor 132 of wireless headwall unit 94 operates in the same manner as communication sensor 120 of patient support apparatus 20. That is, communication sensor 132 is electrically coupled to pins 114a and 114b (corresponding to the Nurse Call Plus (+) and Priority Normally Open/Normally Closed (NO/NC) pins) and checks to see if a voltage is detected on either or both of these pins. If it detects a voltage on either or both of these pins, it concludes that connector 98 of cable 90 is coupled to both interface 116 and wall outlet 60. If it does not detect a voltage on at least one of these pins, it concludes that no cable 90 is coupling interface 116 to wall outlet 60.

In at least one embodiment, controller 130 of wireless headwall unit 94 is configured to report the output of communication sensor 132 (i.e. whether interface 116 is coupled to wall outlet 60 by a cable 90 or not) to patient support apparatus 20. That is, controller 130 uses Bluetooth transceiver 140 (or IR transceiver 138, in some embodiments), to transmit a message to patient support apparatus 20 indicating whether headwall unit 94 is connected to wall outlet 60 or not. In at least one embodiment, patient support apparatus 20 includes an indicator that controller 112 illuminates, displays, or otherwise controls in order to indicate to the user the status of wireless headwall unit 94 vis-a-vis wall outlet 60. In such embodiments, controller 112 may be configured to illuminate an indicator in a first color (e.g. red or amber) if wireless headwall unit 94 transmits a message to patient support apparatus 20 indicating that it is not coupled to wall outlet 60 (as detected by communication sensor 132), and to illuminate the indicator in a second color (e.g. green) if wireless headwall unit 94 transmits a message to patient support apparatus 20 indicating that it is coupled to wall outlet 60 (as also detected by communication sensor 132). In this manner, patient support apparatus 20 provides an indication to the user thereon of the communication status of wireless headwall unit 94.

In some embodiments of patient support apparatus 20, it is configured to automatically select a wired or wireless communication method for communication link 58 based on the signals received from communication sensors 120 and 132. In such embodiments, if communication sensor 120 detects a voltage on pins 114a and/or 114b, controller 112 automatically communicates with wall outlet 60 using cable interface 88. On the other hand, if communication sensor 132 detects a voltage on pins 114a and/or 114b and controller 130 sends a message indicating this detection to patient support apparatus 20 (and to controller 112), controller 112 automatically communicates with wall outlet 60 by sending messages to headwall unit 94 using wireless interface 100. The communication may include not only the audio signals from the remote nurse and/or patient positioned on patient support apparatus 20, but also status data regarding patient support apparatus 20, such as, but not limited to, an alert status of exit detection system 56, the status of side rails 34 (e.g. raised or lowered), the status of a brake, the height of litter frame 28, and/or other status data.

In at least one embodiment, controller 112 is configured, after automatically selecting a wired or wireless communication method (e.g. interface 88 or 100), to continue to use the automatically selected communication method until it either receives a signal from one of the communication sensors 120 or 132 indicating that the currently selected communication method is no longer viable (e.g. a voltage on pins 114a or 114b is no longer detected) or it is instructed by a caregiver to switch communication methods. Thus, for example, if a caregiver unplugs a cable 90 from wall outlet 60 to patient support apparatus 20 and thereafter couples a cable 90 between wall outlet 60 and headwall unit 94, the former act will be detected by communication sensor 120, while the latter act will be detected by communication sensor 132. Based on the signals received from these two sensors 120 and 132, controller 112 will automatically switch from wired communication via interface 88 to wireless communication via wireless interface 100. Patient support apparatus 20 will therefore automatically select whichever communication method is available without requiring any manual instructions or manipulation of any controls on any of the control panels 48 by the caregiver.

Network transceiver 118 (FIG. 7) is a wireless transceiver adapted to communicate with one or more wireless access points 76 of the healthcare facility's local area network 74. In some embodiments, transceiver 118 may be a WiFi transceiver adapted to transmit and receive wireless electrical signals using any of the various WiFi protocols (IEEE 802.11b, 801.11g, 802.11n, 802.11ac . . . , etc.). In other embodiments, network transceiver 118 may be a transceiver adapted to communicate using any of the frequencies, protocols, and/or standards disclosed in commonly assigned U.S. patent application Ser. No. 62/430,500 filed Dec. 6, 2016, by inventor Michael Hayes and entitled NETWORK COMMUNICATION FOR PATIENT SUPPORT APPARATUSES, the complete disclosure of which is incorporated herein by reference. In still other embodiments, transceiver 118 may be a wired transceiver that communicates with network 74 over a wired network, such as an Ethernet cable or the like. Regardless of whether transceiver 118 is a wired or wireless transceiver, it enables controller 112 to communicate with one or more servers on the healthcare facility's network 72, such as, but not limited to, patient support apparatus server 78.

Controller 112 uses network transceiver 118 to send messages to server 78 (and/or server 84) indicating the status of communication link 58. This status information includes data indicating whether patient support apparatus 20 is communicating via cable interface 88 or wireless interface 100, whether cable 90 is coupled between cable interface 88 and outlet 60, whether a cable is coupled between interface 116 and outlet 60, well as status data regarding battery 122 and/or 134, and other information. In some embodiments, server 78 and/or server 84 are configured to share this data with one or more other devices within the healthcare facility. For example, in at least one embodiment, server 78 and/or server 84 are configured to transmit the communication status of patient support apparatus 20 to one more electronic devices 142 (FIG. 4), such as the electronic devices 104a and/or 104b disclosed in commonly assigned U.S. patent application Ser. No. 62/868,947 filed Jun. 30, 2019, by inventors Thomas Durlach et al. and entitled CAREGIVER ASSISTANCE SYSTEM, the complete disclosure of which is incorporated herein by reference. The electronic devices 142 may be smart phones, tablet computers, laptop computers, desktop computers, and/or other computing devices that are in communication with network 74 and therefore able to receive data from patient support apparatus server 78.

In many healthcare facilities, the patient support apparatuses 20 and/or the headwall units 94 that are present within that particular healthcare facility are not all of the same technology generation. In other words, there are multiple types or classes of patient support apparatuses 20 and/or headwall units 94. Each of these technology generations may include technology features that are not present on earlier generations. In some cases, this can lead to mismatches between newer generation devices and older generation devices, particularly where the devices are intended to communicate with each other, such as patient support apparatuses 20 and headwall units 94. Such mismatches can, in some circumstances, lead to a caregiver improperly assuming that communication link 58 has been established and functioning properly when, in fact, it is not.

For example, as was mentioned previously, some earlier generations of headwall units 94 (e.g. headwall units 94b of FIG. 6) are not able to establish RF communications between themselves and a patient support apparatus 20, but instead merely provide a location identifier (and a battery status) to a nearby patient support apparatus 20 via IR transceiver 138. Indeed, earlier generations of headwall units 94 do not include the RF transceiver 140 (or communication sensor 132 or interface 116) of the headwall units 94 of FIG. 7. Thus, if a caregiver positions a patient support apparatus 20 adjacent to such an older generation headwall unit 94 and assumes that the wireless interface 100 of patient support apparatus 20 will establish a wireless communication link 58 with the wall outlet 60 (via the older generation headwall unit 94), the caregiver will be mistaken. This is because the headwall unit 94 cannot be communicatively coupled to wall outlet 60 because it lacks an interface 116 into which a cable 90 can be plugged, and therefore can neither forward data from patient support apparatus 20 to wall outlet 60, nor forward data from wall outlet 60 to patient support apparatus 20.

Similarly, older generations of patient support apparatuses 20 may not be able to wirelessly communicate with a newer generation headwall unit because they may lack RF transceiver 136 and may only be programmed to utilize IR transceiver 128 for receiving location information from an adjacent headwall unit 94. In such a situation, a caregiver may inadvertently position such an older generation patient support apparatus 20 adjacent to a headwall unit 94 (including a newer generation headwall unit 94 that is able to establish a wireless communication link with a newer generation patient support apparatus 20) and assume that the patient support apparatus 20 will be able to establish a wireless communication link 58 with wall outlet 60.

The present disclosure provides various methods for mitigating and/or preventing any mismatches in technology between headwall units 94 and patient support apparatuses 20 that might lead to a non-functional, or less functional, communication link 58 between patient support apparatus 20 and wall outlet 60. These methods include newer generation headwall units 94 being configured to automatically detect if they are communicating (via IR transceiver 138) with an older generation patient support apparatus 20, as well as newer generation patient support apparatuses 20 being configured to automatically detect if they are communicating (via IR transceiver 138) with an older generation headwall unit 94. These methods also include server 78 automatically monitoring the position of patient support apparatuses 20 within the healthcare facility and notifying caregivers if an older generation patient support apparatus 20 is positioned adjacent a newer generations headwall unit 94, or vice versa. Such server-based methods do not rely on newer generation patient support apparatuses 20 and/or newer generation headwall units 94 being able to detect communication with an older generation headwall unit 94 or an older generation patient support apparatus 20.

For purposes of the following written description, the functionality of the newer and older generations of patient support apparatuses 20 and headwall units 94 will be defined as set forth in the table below. It will be understood, however, that the principles described herein may be applied to different types of functionality beyond those specifically listed in the following table. Still further, it will be understood that the principles described herein may be applied to a situations where more than two technology generations exist in a common healthcare facility.

Table 1 below indicates both the functional capabilities of each generation of patient support apparatus 20 and headwall units 94 (in rows 2-5), as well as the absence/presence of various electrical components of these devices (in rows 6-10).

mined through the communication of a unique ID from headwall unit 94 (both gens) to an adjacent patient support apparatus 20 (both gens). RF communication, which, as noted, may comprise Bluetooth (BT) communication, is only possible for second generation patient support apparatuses 20 and headwall units 94, and is not present for first generations of either of these devices.

Turning to the components on each of these generations of patient support apparatuses 20 and headwall units 94 (shown in the bottom five rows of Table 1), it can be seen that RF transceivers 136 are only present on the second generation of headwall units 94 and patient support apparatuses 20, and not present on the first generation of either of these devices. IR transceivers 128 and 138, however, are present on both generations of patient support apparatuses 20 and headwall units 94, respectively.

Communication sensor 120 may be present or it may be absent on first generation patient support apparatuses, depending upon the embodiment of the first generation patient support apparatus 20. Communication sensor 120 is present on the second generation of patient support apparatuses 20. Communication sensor 132 is present in the second generation of, but not the first generation of, headwall units 94. Cable interface 88 is present for all generations of patient support apparatuses 20. Cable interface 116 is only present in the second generation of headwall units 94. Finally, batteries 122 and 124 may be present in all generations of both patient support apparatuses 20 and headwall units 94.

Figure 8:
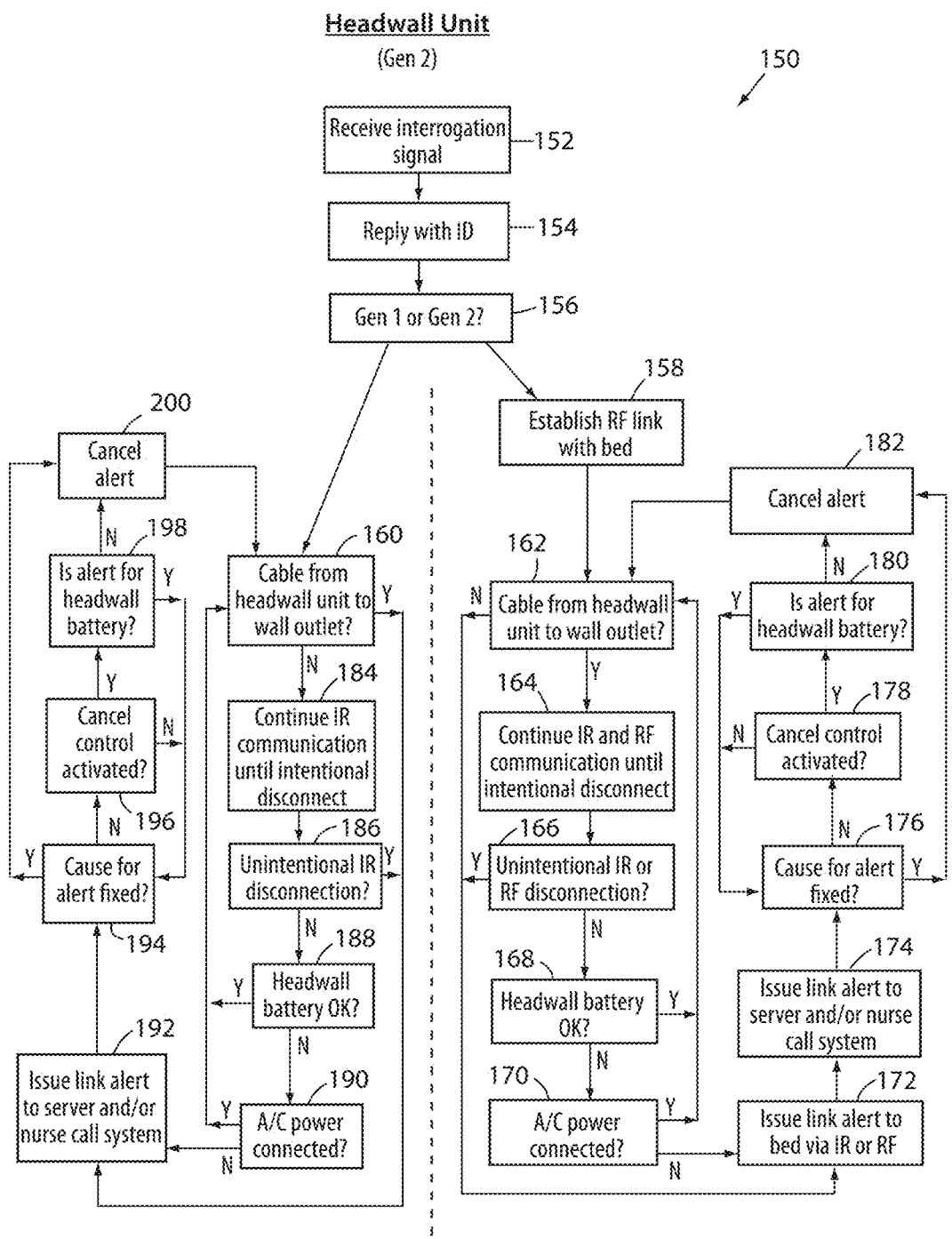
FIG. 8 is a first algorithm that may be executed by a controller onboard a newer generation of the headwall units disclosed herein.

FIG. 8 illustrates one example of an algorithm that may be followed by a second generation headwall unit 94 when a patient support apparatus 20 (either gen 1 or gen 2) is positioned adjacent to the headwall unit 94 and communicates with the headwall unit 94. Algorithm 150 begins at step 152 when it receives an interrogation signal from the nearby patient support apparatus 20. In some embodiments, the interrogation signal is automatically sent by the patient support apparatus 20 (either generation) when the user

TABLE 1

| Feature/Component | Patient Support Apparatus (Gen 1) | Patient Support Apparatus (Gen 2) | Headwall Unit (Gen 1) | Headwall Unit (Gen 2) |
|---|---|---|---|---|
| Wireless link 58 | Absent | Present | Absent | Present |
| Wired link 58 | Present | Present | Absent | Absent |
| IR location | Present | Present | Present | Present |
| BT communication | Absent | Present | Absent | Present |
| BT transceivers (136 or 140) | Absent (136) | Present (136) | Absent (140) | Present (140) |
| IR transceivers (128 or 138) | Present (128) | Present (128) | Present (138) | Present (138) |
| Comm. sensor (120 or 132) | Present/absent (120) | Present (120) | Absent (132) | Present (132) |
| Interface (88 or 116) | Present (88) | Present (88) | Absent (116) | Present (116) |
| Battery (122 or 134) | Present (122) | Present (122) | Present (134) | Present (134) |

Looking at the functions of each of these generations (listed in the first four rows underneath the heading row), it can be seen from Table 1 that first generation patient support apparatuses 20 and headwall units 94 are not able to establish a wireless link 58, but their second generation counterparts are. Patient support apparatuses 20 of both generations are able to establish a wired link 58 between themselves and wall outlet 60. First and second generation headwall units 94 are not able to, and are not used to, establish a wired communication link 58 between patient support apparatus 20 and wall outlet 60 (although second generation headwall units 94 are able to have a cable 90 coupled between themselves and wall outlet 60).

For all generations of patient support apparatuses 20 and headwall units 94, location information is able to be deterapplies the brake and/or plugs patient support apparatus 20 into an electrical outlet 108 (although other triggering conditions for the interrogation signal may, of course, be implemented). In response to receiving the interrogation signal at step 152, controller 130 of headwall unit 94 sends a reply message at step 154 that includes the unique ID of headwall unit 94. In some embodiments, headwall unit controller 130 may also send additional status information at step 152, such as, but not limited to, the charge state of battery 134.

After sending the reply message at step 154, controller 130 moves to step 156 where it determines what generation of patient support apparatus 20 sent the interrogation message at step 152. Controller 130 performs this analysis by examining the structure, content, format, or other characteristics of the interrogation message received at step 152.

Controller 130 is able to perform this analysis because second generation patient support apparatuses 20 are configured to send interrogation messages that have a different structure, content, format, and/or other characteristics than the interrogation messages sent by first generation patient support apparatuses 20.

From step 156 (FIG. 8), controller 130 proceeds to step 158 if it determines the patient support apparatus 20 to be a second generation (i.e. newer generation) patient support apparatus, or to step 160 if it determines the patient support apparatus is a first generation (i.e. older generation) patient support apparatus. Turning first to the steps of algorithm 150 that are followed by controller 130 when the patient support apparatus 20 is a second generation patient support apparatus 20, controller 130 establishes an RF link at step 158 using its RF transceiver 140 (which communicates with RF transceiver 136 onboard second generation patient support apparatuses 20). Once this RF communication link is established, controller 130 proceeds to step 162 where it determines if a cable 90 is currently connected between headwall unit 94 and wall outlet 60. This is performed by sensor 132 in the manner discussed above. If no cable 90 is detected by sensor 132 at step 162, controller 130 proceeds to step 172. If a cable is detected at step 162, controller 130 proceeds to step 164.

At step 164 controller 130 carries out its normal communications with patient support apparatus 20 using transceivers 138 and 140. This communication also involves forwarding data received from patient support apparatus 20 to the appropriate pins 114 of interface 116, as well as forwarding data received from one or more of the pins 114 of interface 116 to patient support apparatus 20 via transceivers 138 and/or 140. This normal communication continues until headwall unit 94 receives a signal from the patient support apparatus 20 indicating that it is intentionally going to disconnect its communication link with headwall unit 94. Such intentional disconnect signals may be triggered by patient support apparatus 20 in one or more ways. In some embodiments, patient support apparatus 20 includes a control 126 that, when manually activated by a caregiver, causes patient support apparatus 20 to send an intentional disconnect signal. Alternatively, or additionally, patient support apparatus 20 may be configured to automatically send an intentional disconnect signal when one or both of the following occurs: patient support apparatus 20 is unplugged from electrical outlet 108 and/or the brake on patient support apparatus 20 is released. In such situations, controller 112 of patient support apparatus 20 may be configured to automatically send the intentional disconnect message because the action of unplugging patient support apparatus 20 and releasing its brake are indicative of the likelihood that patient support apparatus 20 is going to be moved away from headwall unit 94, and thus the communication link 58 is going to be intentionally broken.

While carrying out its normal communications, controller 130 of headwall unit 94 is configured to perform a number of other steps, such as steps 166 through 182 of algorithm 150 (FIG. 8). At step 166, controller 130 checks to see if an unintentional disconnection has occurred between either its IR communications with patient support apparatus 20 or its RF communications with patient support apparatus 20. In many embodiments, patient support apparatus 20 and headwall unit 94 are configured to send periodic heartbeat messages to each other using both their IR and RF transceivers. Controller 130 checks to see if there has been a cessation in these heartbeat messages at step 166 and, if there has been, proceeds to step 172. If there has been no cessation of these heartbeat messages, controller 130 proceeds to step 168.

At step 168, controller 130 checks the charge level of battery 134 and compares it to a threshold. If the charge level is under the threshold, that is an indication that battery 134 should be replaced soon. If it is above the threshold, that is an indication that battery 134 does not need to be replaced soon. The particular value of the threshold can be varied according to the amount of lead time healthcare administrators may want before a battery 134 goes dead. In some embodiments, the threshold may be in the range of fifty percent. Other thresholds can, of course, be used.

If controller 130 determines at step 168 that the charge state of battery 134 is above the threshold, it returns to step 162 and cycles through the steps previously described. If controller 130 determines at step 168 that the charge state of battery 134 is below the threshold, it proceeds to step 170 where it determines if headwall unit 94 is currently coupled to an electrical outlet, such as outlet 108 (FIG. 4). If headwall unit 94 is currently receiving electrical power from an electrical outlet, controller 130 returns to step 162 and cycles through the steps previously described. If controller 130 determines at step 170 that headwall unit 94 is not currently receiving electrical power from an external source, it proceeds to step 172.

At step 172, controller 130 issues a link alert to patient support apparatus 20 using one or both of transceivers 138, 140. In some embodiments, patient support apparatus 20 is configured to display this link alert on display 124 (and/or display it via one or more lights, icons, or other indicators on patient support apparatus 20). Additionally, or alternatively, patient support apparatus 20 may be configured to send this link alert to server 78 via network transceiver 118 so that server 78 can forward this alert to one or electronic devices 142 that are associated with the healthcare providers assigned to care for the patient currently assigned to patient support apparatus 20. Whether sent to an electronic device 142 or indicated on patient support apparatus 20, the link alert informs healthcare providers that something is either wrong with, or may soon go wrong with, the wireless communication link 58 for that particular patient support apparatus 20.

After sending the link alert at step 172 (FIG. 8), controller 130 proceeds to step 174 where it issues the same link alert, but transmits it through one or more different mechanisms and/or sends it to one or more different recipients. Specifically, in some embodiments, controller 130 sends a link alert to the nurse call system via wall outlet 60 at step 172. This link alert may be sent by controller 130 instructing interface 116 to stop electrically shorting together at least one pair of pins 114. The particular pair of pins that are selected correspond to the pins 114 that function as an interlock for the particular nurse call system 68 that is installed in that particular healthcare facility. The interlocks are the pins 114 that the nurse call system 68 uses to detect if a device (e.g. patient support apparatus 20) is electrically coupled to wall outlet 60. The nurse call system concludes that a device is electrically coupled to the wall outlet 60 if these pins 114 are electrically shorted together, and typically will issue a "cord-out" alert when these pins cease being electrically shorted together. Controller 130 is configured to automatically short together these pins when it is coupled to wall outlet 60 except in situations where it issues a link alert, such as at step 174 of algorithm 150.

The coupling together (electrical shorting) of the interlock pins 114 is detected by the nurse call system 68 by sending a signal to one of the two pins that are coupled together and looking for the signal to return on the other one of the two pins 114 that are coupled together. If the return signal is detected, nurse call system 68 is able to confirm that a device (e.g. patient support apparatus 20 or headwall unit 94) is communicatively coupled to itself. If the nurse call system 68 does not detect the return signal, it concludes that no device is currently coupled to nurse call system 68 and issues a "cord-out" alert, which is an alert communicated to caregivers that the patient support apparatus 20 in a particular room is no longer communicatively coupled to the nurse call system 68 (and the patient associated with that patient support apparatus is therefore unable to communicate with nurse call system 68).

Because different nurse call systems 68 use different pairs of pins to detect the presence of a patient support apparatus, patient support apparatus 20 and headwall unit 94 need to be properly instructed as to which pins 114 to short together when there is no "cord-out" alert, and which pins 114 to stop shorting together where this is a cord-out alert. These instructions are taken care of when patient support apparatus 20 and/or headwall unit 94 are configured. Several methods for configuring headwall unit 94 and/or patient support apparatus 20 are disclosed in commonly assigned PCT patent application PCT/US2021/032426 filed May 14, 2021, by applicant Stryker Corporation, and entitled PATIENT SUPPORT APPARATUSES WITH HEADWALL COMMUNICATION; in commonly assigned PCT patent application PCT/US2020/049125 filed Sep. 3, 2020, by applicant Stryker Corporation, and entitled PATIENT SUPPORT APPARATUSES WITH NURSE CALL CONNECTION DETECTION; and in commonly assigned U.S. patent application Ser. No. 17/241,842 filed Apr. 27, 2021, by inventors Frank Lee et al. and entitled WIRELESS SERVICE TECHNOLOGY FOR PATIENT SUPPORT APPARATUSES; the complete disclosures of all of which are incorporated herein by reference.

For some nurse call systems 68, the "cord-out" interlocks that must be electrically shorted together to avoid a "cord-out" alert are pins 10 and 11 of a conventional 37-pin connector (see FIG. 18). For other nurse call system 68, the "cord-out" interlocks that must be electrically shorted together to avoid a "cord-out" alert are pins 7 and 25 of a conventional 37-pin connector (FIG. 18). For still other nurse call system 68, it is pins 8 and 9 that are electrically shorted together to avoid a "cord-out" alert. And for some nurse call systems 68, there are multiple pairs of pins that must be electrically shorted together in order to avoid a "cord-out" alert. For example, in some nurse call systems, pins 25 and 26 must be shorted together along with pins 30 and 31. As was noted, headwall unit 94 and its controller 130 are supplied with this information when they are configured.

Regardless of which pins 114 of a nurse call system correspond to the interlock pins 114 (and thus are used for initiating a "cord-out" alert), controller 130 is configured in at least some embodiments to stop shorting this pair (or these pairs, for some nurse call systems) together at step 174 (FIG. 8), thereby prompting the nurse call system 68 to initial a "cord-out" alert, which is designed to get the attention of the appropriate caregivers. In addition to, or in lieu of, changing the electrical state of one or more pins 114 at step 174, controller 130 of headwall unit 94 may be configured to send a link alert to server 78. The alert sent at step 174 to server 78 differs from the alert sent at step 172 because it bypasses patient support apparatus 20. That is, some headwall units 94 (that are second generation or later) further include their own network transceiver (not shown) that allows them to communicate directly with computer network 74 without having to forward such communications to patient support apparatus 20 (which then forwards them to network 74 using its network transceiver 118). Such headwall units 94 may be configured to send a link alert to server 78 at step 174.

After completing step 174 (FIG. 8), controller 130 proceeds to step 176 where it checks to see if the cause for the link alert has been remedied. This may include battery 134 being replaced or re-charged, headwall unit 94 being plugged into an electrical power outlet 108, and/or the restoration of communication with patient support apparatus 20. If the cause for the link alert has been remedied, controller 130 proceeds to step 182 where it cancels the alert. From step 182, it returns to step 162 and proceeds in the manner previously described. If the cause for the link alert has not been remedied at step 176, controller 130 proceeds to step 178.

At step 178, controller 130 checks to see if a caregiver has activated a cancel control. The cancel control may be a button, switch, or other control that is mounted on headwall unit 94 and adapted to be manually activated by a caregiver. Alternatively, or additionally, patient support apparatus 20 may have a control 126 that, when activated, causes it to send a cancel message to headwall unit 94 (via IR or RF). However implemented, controller 130 checks at step 178 to see if a caregiver has activated the cancel control. If so, it proceeds to step 180. If not, it returns to step 176.

At step 180, controller 130 checks to see if the cause of the link alert (issued at steps 172 and/or 174) is a low charge level for battery 134. If it is, it returns back to step 176 without cancelling the link alert. If it is not due to the charge level of battery 134, it proceeds to step 182 and cancels the link alert. The purpose of step 180, which may be omitted in some embodiments, is to prevent a caregiver from cancelling a link alert when the battery is below a threshold, thereby compelling the caregiver to fix the battery issue in order to stop the link alert.

Returning back to step 156 (FIG. 8), if controller 130 determines that it is communicating with a first (or earlier) generation patient support apparatus 20, it proceeds to step 160. At step 160, it checks to see if a cable 90 is coupled between headwall unit 94 and wall outlet 60. Step 160 is performed in the same manner as step 162. However, controller 130 responds to the results of step 160 in a different manner than it does for step 162. That is, if controller 130 detects the presence of a cable at step 160, it proceeds to step 192 where it issues a link alert. This is done because, when headwall unit 94 is communicating with a first generation patient support apparatus 20, the first generation patient support apparatus 20 does not have the ability to wirelessly send or receive messages via an RF transceiver, and it is therefore unable to communicate with wall outlet 60. In such situations, the first generation patient support apparatus 20 must have a cable 90 coupled between it and wall outlet 60 in order to establish wired communication link 58. However, if controller 130 detects that its cable 90 is coupled to wall outlet 60 at step 160, it means that the cable 90 has not been connected properly. Specifically, it means that cable 90 is currently coupled between headwall unit 94 and wall outlet 60, when it should in fact be connected between wall outlet 60 and patient support apparatus 20.

If controller 130 detects at step 160 that no cable 90 is currently connected between headwall unit 94 and wall outlet 60, it proceeds to step 184 without issuing an alert. At step 184, headwall unit 94 continues to transmit periodic messages to patient support apparatus 20 via IR transceiver

138. These messages may include heartbeat messages, status messages (e.g. status of battery 134), and/or location messages (e.g. messages that contain headwall unit 94's unique ID). These messages may continue for as long as no intentional disconnection is detected. Such an intentional disconnection may be communicated to headwall unit 94 via IR transceiver 138 if the first generation patient support apparatus 20 is configured to be able to send such a message. Alternatively, the first generation patient support apparatus 20 may not be configured to be able to send an intentional disconnect message, in which case the communication of step 184 continues until any type of disconnection is detected (intentional or unintentional).

At step 186 (FIG. 8), controller 130 determines if a disconnection was intentional or unintentional. As was noted, in some embodiments of first generation patient support apparatuses 20, no intentional disconnect signals are transmitted to headwall unit 94, so controller 130 is configured to conclude that all disconnections that are detected at step 186 are unintentional unless an intentional signal is received. Alternatively, in a different embodiment, controller 130 may be configured to conclude the opposite at step 186, i.e. that all disconnections are intentional, in which case controller 130 always proceeds to step 188.

If controller 130 determines at step 186 that the IR communication disconnection was unintentional, it proceeds to step 192 where it issues a link alert. If controller 130 determines at step 186 that the IR communication disconnection was intentional, it proceeds to step 188. At step 188, controller 130 checks the status of battery 134 in the same manner as step 168. If the charge level of battery 134 is less than the threshold, it proceeds to step 190. If the charge level of the battery 134 is above the threshold, it returns to step 160 where it cycles through the previously mentioned steps.

At step 190 (FIG. 8), controller 130 checks to see if headwall unit 94 is coupled to an external source of electrical power. Step 190 is the same as step 170. If the answer is no, controller 130 proceeds to step 192 where it issues a link alert. If it is yes, controller 130 returns to step 160 where it cycles through the previously mentioned steps.

At step 192, controller 130 issues a link alert in any of the same ways it does during step 174. It does not issue an alert by sending a message to patient support apparatus 20 (like it does at step 172) because, due to it being a first generation patient support apparatus 20, the patient support apparatus 20 is not equipped to receive and/or interpret such a message (it does not have a BT transceiver 136 and its IR transceiver is only configured to interpret location data and battery status data from IR transceiver 138).

After issuing the alert at step 192, controller 130 proceeds to steps 194, 196, 198, and/or 200. These four steps are the same as steps 176, 178, 180, and 182, respectively, and do not need to be re-described herein. Suffice it to say that, after the link alert of step 192 is successfully cancelled or remedied, controller 130 will return to step 160 and cycle through the previously described steps.

It will be understood that extensive modifications may be made to algorithm 150. Such modifications include changing the order of one or more steps, adding one or more steps, and/or omitting one or more steps. As several non-exhaustive examples, the order of steps 154 and 156 may be switched; the identification of whether patient support apparatus 20 is a first or second generation device may be based on a message separate from the interrogation message (e.g. a heartbeat message, or other message); the alerting for a low battery condition may be subject to cancellation via the cancel control; one or more of the alerting methods at steps

172, 174, and/or 192 may be omitted or supplemented; a battery alert may be issued even if the headwall unit is currently coupled to an external power source (e.g. outlet 108); and/or still other modifications may be made.

Figure 9:
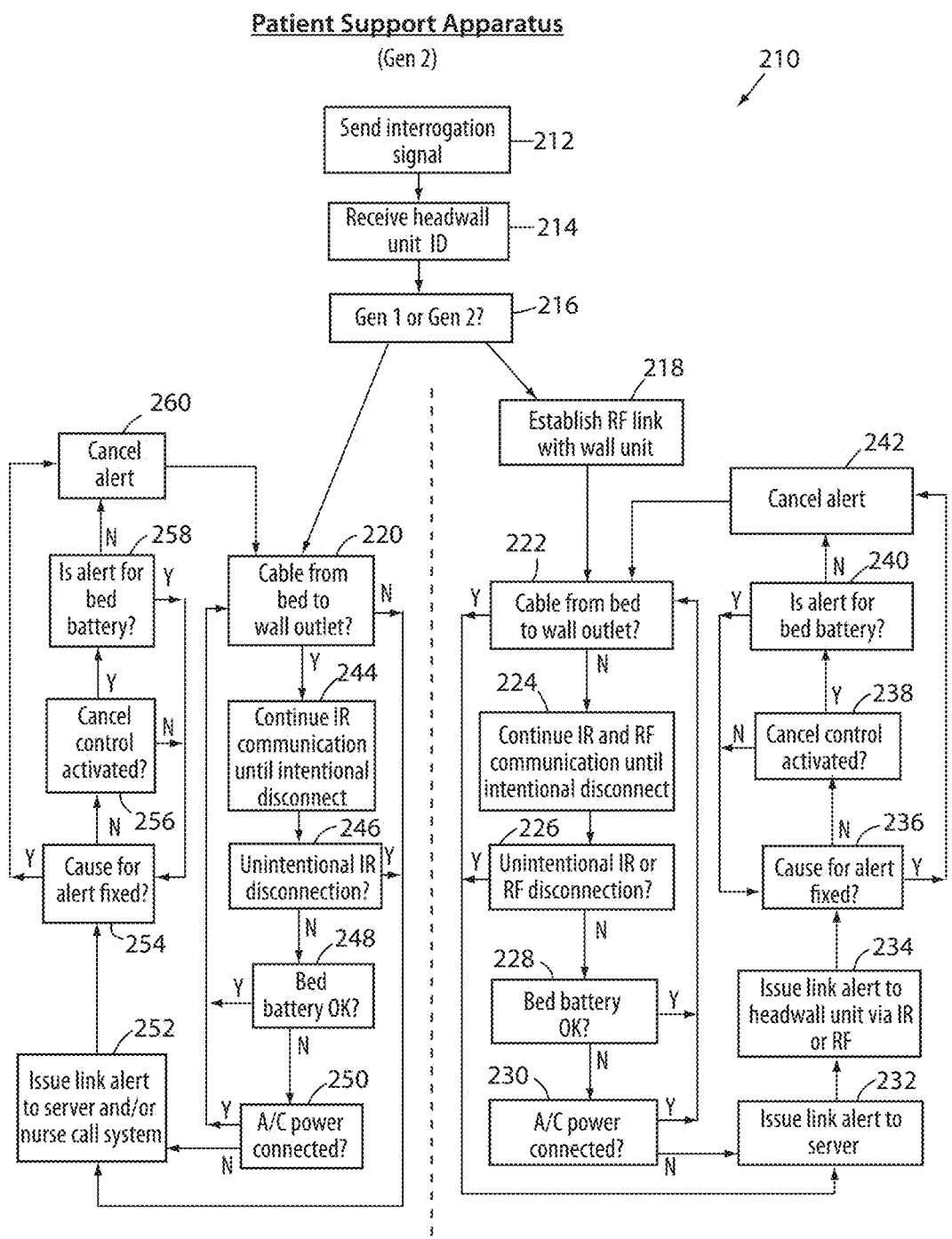
FIG. 9 is a first algorithm that may be executed by a controller onboard a newer generation of the patient support apparatuses herein.

FIG. 9 illustrates an algorithm 210 that may be executed by controller 112 of a second generation patient support apparatus 20 when it is positioned adjacent to either a first or second generation headwall unit 94. Algorithm 210 begins at step 212 when controller 112 sends out an interrogation signal to the nearby headwall unit 94. As was noted previously, in some embodiments, the interrogation signal is automatically sent by the patient support apparatus 20 when the user applies the brake and/or plugs patient support apparatus 20 into an electrical outlet 108 (although other triggering conditions for the interrogation signal may, of course, be implemented). After sending the interrogation signal at step 212, controller 112 of patient support apparatus 20 awaits a reply message from the headwall unit at step 214. The reply message includes the unique ID of the headwall unit 94. And, in some embodiments, the reply message may include additional information, such as, but not limited to, the charge state of battery 134.

After receiving the reply message at step 214, controller 112 moves to step 216 where it determines what generation of headwall unit 94 sent the reply message at step 214. Controller 112 performs this analysis by examining the structure, content, format, or other characteristics of the reply message received at step 214. Controller 112 is able to perform this analysis because second generation headwall units 94 are configured to send reply messages that have a different structure, content, format, and/or other characteristics than the reply messages sent by first generation headwall units 94.

From step 216 (FIG. 9), controller 112 proceeds to step 218 if it determines the headwall unit 94 is a second generation (i.e. newer generation) headwall unit 94, or to step 220 if it determines the headwall unit 94 is a first generation (i.e. older generation) headwall unit 94. Turning first to the steps of algorithm 210 that are followed by controller 112 when the headwall unit 94 is a second generation headwall unit, controller 112 establishes an RF link at step 218 using its RF transceiver 136 (which communicates with RF transceiver 140 onboard headwall unit 94). Once this RF communication link is established, controller 112 proceeds to step 222 where it determines if a cable 90 is currently connected between wall outlet 60 and cable interface 88. This is performed by sensor 120 in the manner discussed above. If no cable 90 is detected by sensor 120 at step 222, controller 112 proceeds to step 224. If a cable is detected at step 222, controller 112 proceeds to step 232. In some embodiments, step 222 is omitted entirely and controller 112 proceeds from step 218 directly to step 224 (and controller 112 also proceeds from step 242 directly to step 224).

In those embodiments of patient support apparatus 20 that are configured to include step 222, controller 112 is instructed to proceed to the alerting step 232 when cable 90 is coupled between patient support apparatus 20 and wall outlet 90 because this alerts the caregiver to the fact that the wireless communication abilities of the second generation headwall unit 94 are not being utilized. Communication between patient support apparatus 20 and wall outlet 60, however, remains fully functional, which is why step 22 may be omitted in some embodiments.

At step 224, controller 112 carries out normal infrared and/or RF communication between itself and headwall unit 94. This includes the communication of any status data of patient support apparatus 20 to headwall unit 94, the transmission of audio signals to/from patient support apparatus 20, commands for controlling TV 86 and/or other room devices, status messages and alerts regarding headwall unit 94, and/or other information.

This normal communication continues until patient support apparatus 20 determines that an intentional disconnect is happening for its communication link with headwall unit 94. Intentional disconnect signals may be generated in different manners for conveying that a disconnect is intentional. In some embodiments, patient support apparatus 20 includes a control 126 that, when manually activated by a caregiver, causes patient support apparatus 20 to generate and send an intentional disconnect signal to headwall unit 94. Alternatively, or additionally, patient support apparatus 20 may be configured to automatically send an intentional disconnect signal when one or both of the following occurs: patient support apparatus 20 is unplugged from electrical outlet 108 and/or the brake on patient support apparatus 20 is released. In such situations, controller 112 of patient support apparatus 20 may be configured to automatically send the intentional disconnect message because the action of unplugging patient support apparatus 20 and releasing its brake are indicative of the likelihood that patient support apparatus 20 is going to be intentionally moved away from headwall unit 94, and thus the wireless communication link 58 is going to be intentionally broken.

While carrying out its normal communications, controller 112 of patient support apparatus 20 is configured to perform a number of other steps, such as steps 226 through 242 of algorithm 210 (FIG. 9). At step 226, controller 112 checks to see if an unintentional disconnection has occurred between either its IR communications with headwall unit 94 or its RF communications with headwall unit 94. In many embodiments, patient support apparatus 20 and headwall unit 94 are configured to send periodic heartbeat messages to each other using both their IR and RF transceivers. Controller 112 checks to see if there has been a cessation in these heartbeat messages at step 226 and, if there has been, proceeds to step 232. If there has been no cessation of these heartbeat messages, controller 112 proceeds to step 228.

At step 228 (FIG. 9), controller 112 checks the charge level of battery 122 and compares it to a threshold. If the charge level is under the threshold, that is an indication that battery 122 should be replaced soon. If it is above the threshold, that is an indication that battery 122 does not need to be replaced soon. The particular value of the threshold can be varied according to the amount of lead time healthcare administrators may want before a battery 122 goes dead. In some embodiments, the threshold may be in the range of fifty percent. Other thresholds can, of course, be used. It will be understood that the threshold used for battery 122 at step 228 may be the same as, or different from, the threshold used for battery 134 at step 168 (FIG. 8).

If controller 112 determines at step 228 (FIG. 9) that the charge state of battery 122 is above the threshold, it returns to step 222 and cycles through the steps previously described. If controller 112 determines at step 228 that the charge state of battery 122 is below the threshold, it proceeds to step 230 where it determines if patient support apparatus 20 is currently coupled to an electrical outlet, such as outlet 108 (FIG. 4). If patient support apparatus 20 is currently receiving electrical power from an electrical outlet, controller 112 returns to step 222 and cycles through the steps previously described. If controller 112 determines at step 230 that patient support apparatus 20 is not currently receiving electrical power from an external source, it proceeds to step 232.

At step 232, controller 112 issues a link alert to server 78. In some embodiments, controller 112 of patient support apparatus 20 may also, or alternatively, display this link alert on display 124 (and/or display it via one or more lights, icons, or other indicators on patient support apparatus 20). In response to receiving the link alert, server 78 is configured to forward this alert to one or electronic devices 142 that are associated with the healthcare providers assigned to care for the patient currently assigned to patient support apparatus 20. Whether sent to an electronic device 142 or indicated on patient support apparatus 20, the link alert informs healthcare providers that something is either wrong with, or may soon go wrong with, the wireless communication link 58 between that particular patient support apparatus 20 and its adjacent wall outlet 60.

After sending the link alert at step 232 (FIG. 9), controller 112 proceeds to step 234 where it issues the same link alert, but transmits it through one or more different mechanisms and/or sends it to one or more different recipients. Specifically, in some embodiments, controller 112 sends the link alert to the nurse call system by forwarding the alert to headwall unit 94 (either by IR or RF transceivers 128, 136). When received by headwall unit 94, controller 130 of headwall unit 94 is configured to stop electrically shorting together at least one pair of pins 114. The particular pair of pins that are selected correspond to the pins 114 that function as interlocks for the particular nurse call system 68 that is installed in the healthcare facility. The pins were previously described above with respect to algorithm 150, and that description need not be repeated herein.

After completing step 234 (FIG. 9), controller 112 proceeds to step 236 where it checks to see if the cause for the link alert has been remedied. This may include battery 122 being replaced or re-charged, a cable 90 being removed from between patient support apparatus 20 and wall outlet 60 so that headwall unit 94 can be coupled to wall outlet 60 by a cable, patient support apparatus 20 being plugged into an electrical power outlet 108, and/or the restoration of communication with headwall unit 94 after an unintentional disconnection. If the cause for the link alert has been remedied, controller 112 proceeds to step 242 where it cancels the alert. From step 242, it returns to step 222 and proceeds in the manner previously described. If the cause for the link alert has not been remedied at step 236, controller 112 proceeds to step 238.

At step 238, controller 112 checks to see if a caregiver has activated a cancel control. The cancel control may be a button, switch, or other control that is mounted on patient support apparatus 20 and adapted to be manually activated by a caregiver. Alternatively, or additionally, headwall unit 94 may have a cancel control that, when activated, is forwarded to patient support apparatus 20. However implemented, controller 112 checks at step 238 to see if a caregiver has activated the cancel control. If so, it proceeds to step 240. If not, it returns to step 236.

At step 240, controller 112 checks to see if the cause of the link alert (issued at steps 232 and/or 234) is a low charge level for battery 122. If it is, it returns back to step 236 without cancelling the link alert. If it is not due to the charge level of battery 122, it proceeds to step 242 and cancels the link alert. The purpose of step 240, which may be omitted in some embodiments, is to prevent a caregiver from cancelling a link alert when the battery 122 is below a threshold, thereby compelling the caregiver to fix the battery issue in order to stop the link alert.

Returning back to step 216 (FIG. 9), if controller 112 determines that it is communicating with a first (or earlier) generation headwall unit 94, it proceeds to step 220. At step 220, it checks to see if a cable 90 is coupled between patient support apparatus and wall outlet 60. Step 220 is performed in the same manner as step 222. If controller 112 detects the absence of a cable at step 220, it proceeds to step 252 where it issues a link alert. This is done because, when patient support apparatus 20 is communicating with a first generation headwall unit 94, the first generation headwall unit 94 does not have the ability to wirelessly send or receive messages via an RF transceiver, and it is therefore unable to communicate with wall outlet 60. In such situations, patient support apparatus 20 can only be coupled to wall outlet 60 via a cable 90 between itself and wall outlet 60. Therefore, if controller 112 detects the absence of this cable at step 220, it issues a link alert.

If controller 112 detects at step 220 that a cable 90 is currently connected between patient support apparatus 20 and wall outlet 60, it proceeds to step 244 without issuing an alert. At step 244, patient support apparatus 20 continues to transmit periodic messages to headwall unit 94 via IR transceiver 138. Headwall unit 94 may also send transmissions to patient support apparatus 20 during step 244. In some first generation headwall units 94, this communication includes only periodic re-transmissions of the headwall unit 94's unique ID, battery status updates, and, in some embodiments, heartbeat messages. Other types of IR messages, however, may be sent by headwall unit 94 to patient support apparatus 20, and the IR messages between patient support apparatus 20 and headwall unit 94 may continue during step 244 for as long as no intentional disconnection is detected by patient support apparatus 20.

If an unintentional disconnection is detected by controller 112, it proceeds to step 252 where it issues a link alert. If no unintentional disconnection is detected by controller 112 at step 246, it proceeds to step 248. In some embodiments, controller 112 interprets all disconnections as unintentional unless it detects one or more conditions onboard patient support apparatus 20, such as the release of the brake and the unplugging of a power cord from electrical outlet 108.

At step 248, controller 112 checks the status of battery 122 in the same manner as it does at step 228. If the charge level of battery 122 is less than the threshold, it proceeds to step 250. If the charge level of the battery 122 is above the threshold, it returns to step 220 where it cycles through the previously mentioned steps.

At step 250 (FIG. 9), controller 112 checks to see if patient support apparatus 20 is coupled to an external source of electrical power. Step 250 is the same as step 230. If the answer is no, controller 112 proceeds to step 252 where it issues a link alert. If it yes, controller 112 returns to step 220 where it cycles through the previously mentioned steps.

At step 252, controller 112 issues a link alert to server 78 and/or to wall outlet 60. It does not issue an alert by sending a wireless message to headwall unit 94 (like it may do at step 234) because, due to headwall unit 94 being a first generation device, it is not equipped to receive and interpret such a message (it does not have a BT transceiver 140 and its IR transceiver 138 is only configured to send location and status data to patient support apparatus 20). In some embodiments, controller 112 is configured to issue the link alert to the nurse call system at step 252 by instructing cable interface 88 to stop shorting together the interlock pins 114 mentioned above. Because cable interface 88 is electrically coupled to wall outlet 60 via a cable 90, this cessation of the electrical shorting of these two pins is interpreted by the nurse call system as a "cord-out" alert. The nurse call system is thus recruited into the notification efforts of the link alert associated with patient support apparatus 20.

If cable 90 is not coupled between patient support apparatus 20 and wall outlet 60, as detected at step 220, then controller 112 of patient support apparatus 20 is not able to send a signal to the nurse call system via wall outlet 60 because any changes in the electrical characteristics of pins 114 will not be detected by wall outlet 60 (due to the lack of a cable). In such instances, patient support apparatus 20 only issues the link alert at step 252 by sending a message to server 78 and/or displaying an alert condition on patient support apparatus 20 (e.g. via display 124 and/or one or more other indicators onboard patient support apparatus 20).

After issuing the alert at step 252, controller 112 proceeds to steps 254, 256, 258, and 260. These four steps are the same as steps 236, 238, 240, and 242, respectively, and do not need to be re-described herein. Suffice it to say that, after the link alert of step 252 is successfully cancelled or remedied, controller 112 will return to step 220 and cycle through the previously described steps.

It will be understood that, as with algorithm 150, extensive modifications may be made to algorithm 210. Such modifications include changing the order of one or more steps, adding one or more steps, and/or omitting one or more steps. As several non-exhaustive examples, the order of steps 214 and 216 may be switched; the identification of whether headwall unit 94 is a first or second generation device may be based on a message separate from the interrogation reply message (e.g. a heartbeat message, or other message); the alerting for a low battery condition may be subject to cancellation via the cancel control; one or more of the alerting methods at steps 232, 234, and/or 252 may be omitted or supplemented; a battery alert may be issued even if the patient support apparatus 20 is currently coupled to an external power source (e.g. outlet 108); and/or still other modifications may be made.

Figures 10, 11:
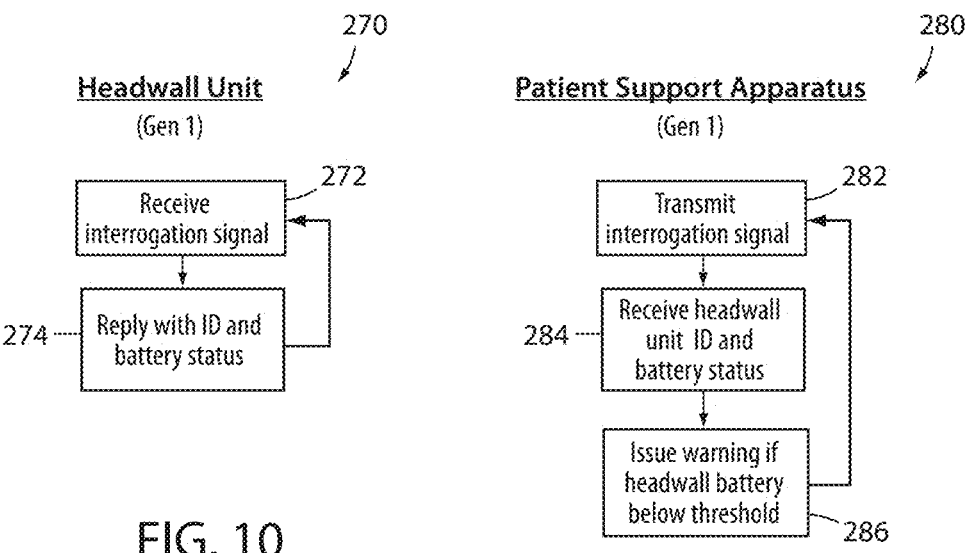
FIG. 10 is a second algorithm that may be executed by a controller onboard an older generation of the headwall units disclosed herein.
FIG. 11 is a second algorithm that may be executed by a controller onboard an older generation of the patient support apparatuses disclosed herein.

FIG. 10 illustrates one example of an algorithm 270 that may be followed by a first generation headwall unit 94 when a patient support apparatus 20 (either gen 1 or gen 2) is positioned adjacent to the headwall unit 94 and communicates with the headwall unit 94. Algorithm 270 begins at step 272 when it receives an interrogation signal from the nearby patient support apparatus 20. As was noted previously, this interrogation signal may be automatically sent by the patient support apparatus 20 (either generation) when the user applies the brake and/or plugs patient support apparatus 20 into an electrical outlet 108 (although other triggering conditions for the interrogation signal may, of course, be implemented). In response to receiving the interrogation signal at step 272, controller 130 of headwall unit 94 sends a reply message at step 274 that includes the unique ID of headwall unit 94. In some embodiments, headwall unit controller 130 may also send additional status information at step 274, such as, but not limited to, the charge state of battery 134. From step 274, controller 130 returns to step 272 and algorithm 270 repeats.

FIG. 11 illustrates an algorithm 280 that may be executed by controller 112 of a first generation patient support apparatus 20 when it is positioned adjacent to either a first or second generation headwall unit 94. Algorithm 280 begins at step 282 when controller 112 sends out an interrogation signal to the nearby headwall unit 94. In some embodiments, the interrogation signal is automatically sent by the patient support apparatus 20 when the user applies the brake and/or plugs patient support apparatus 20 into an electrical outlet 108 (although other triggering conditions for the interrogation signal may, of course, be implemented). After sending the interrogation signal at step 282, controller 112 of patient support apparatus 20 awaits a reply message from the headwall unit at step 284. The reply message includes the unique ID of the headwall unit 94. And, in some embodiments, the reply message may include additional information, such as, but not limited to, the charge state of battery 134.

After receiving the reply message at step 284, controller 112 moves to step 286 where it issues an alert if the charge of the battery 134 is below a threshold. The alert may be issued by sending a message to server 78 and/or by displaying an alert message on display 124 and/or by changing the state of one or more indicators onboard patient support apparatus 20. From step 286, controller 112 returns to step 282 and algorithm 280 repeats.

Various modifications can be made to algorithms 270 and/or 280. Such modifications include changing the order of one or more steps, adding one or more steps, and/or omitting one or more steps. As several non-exhaustive examples, headwall unit 94 may send more data than its unique ID and battery status in response to an interrogation message. Alternatively, headwall unit 94 may omit sending any battery information. Further, in all of the algorithms 150, 210, 270, and 280 discussed herein, the interrogation signals may alternatively be sent by headwall unit 94 instead of patient support apparatus 20. Still further, patient support apparatus 20 (either gen) may be configured to send the headwall ID and its own unique patient support apparatus ID to server 78 after receiving the headwall unit's ID at step 214 and/or step 284. Still other modifications are possible.

Although the foregoing descriptions of patient support apparatuses 20 and headwall units 94 have described either or both of these devices as having the intelligence to determine when a first generation device is communicating with a second generation device, or vice versa, it will be understood that the mismatching of technology generations between patient support apparatuses 20 may alternatively, or additionally, be carried out by server 78. For example, in some embodiments, server 78 is informed of the technology generation of each headwall unit 94 when they are initially installed within the healthcare facility. This information may be communicated to server 78 by directly feeding it data that identifies the generation of each headwall unit 94. Alternatively, server 78 may be programmed to be able to automatically determine the generation of a headwall unit according to the format, structure, sequence, or other characteristics of the unique ID of the headwall units 94 (which get sent to server 78 via patient support apparatuses 20 for all generations of headwall units 94 and all generations of patient support apparatuses 20).

Similarly, the generation of each patient support apparatus 20 may also be directly fed to server 78, or server 78 may be programmed to automatically determine the generation of a patient support apparatus 20 according to the format, structure, sequence, or other characteristics of the patient support apparatus ID that gets sent with each (or at least one) message patient support apparatus 20 sends to server 78 via network transceiver 118.

However populated, server 78 contains data indicating the generation of each headwall unit 94 and each patient support apparatus 20. Server 78 is configured to use this data to determine whether any patient support apparatus 20 of a first generation is communicating with an adjacent headwall unit

94 of a second generation, or vice versa. Server 78 is informed of the communication between a patient support apparatus 20 and an adjacent headwall unit 94 by one or more messages sent by controller 112 to server 78. That is, each controller 112 is configured to send the unique headwall ID it receives (at steps 214 or 284), along with its own unique patient support apparatus ID, whenever it begins communicating with an IR transceiver 138 onboard the headwall unit 94. Thus, when patient support apparatus 20 is moved to a position in front of a different headwall unit 94, it will send a different headwall ID to patient support apparatus server 78. Server 78 is therefore apprised of the type of headwall unit that each patient support apparatus 20 is communicating with.

Server 78 is configured, in some embodiments, to issue an alert any time there is a mismatch between the technology generations of a patient support apparatus 20 and its adjacent headwall unit 94. In other embodiments, server 78 may be configured to only issue an alert when there is a mismatch and one or more other concurrent condition(s). Those concurrent conditions may include, for example, the absence of a cable 90, or the presence of a cable 90 coupled to the wrong device (headwall unit 94 or patient support apparatus 20), or other conditions.

Server 78 is configured to issue an alert by sending a message to one or more electronic devices 142 (FIG. 4). In some embodiments, server 78 executes a caregiver assistance software application that is adapted to transmit bed status data, patient data, and/or other information to specific caregivers associated with specific patient support apparatuses, and the sending of a technology-mismatch alert is included as part of the data sent by caregiver assistance software application. In some embodiments, the caregiver assistance software application may be the same as, or include any of the same functionality as, the caregiver assistance software application 124 disclosed in commonly assigned PCT patent application PCT/US2020/039587 filed Jun. 25, 2020, by applicant Stryker Corporation and entitled CAREGIVER ASSISTANCE SYSTEM, the complete disclosure of which is incorporated herein by reference. Still other types of software applications may be executed on server 78 and/or the electronic devices 142 for carrying out the notifications discussed herein.

Figure 12:
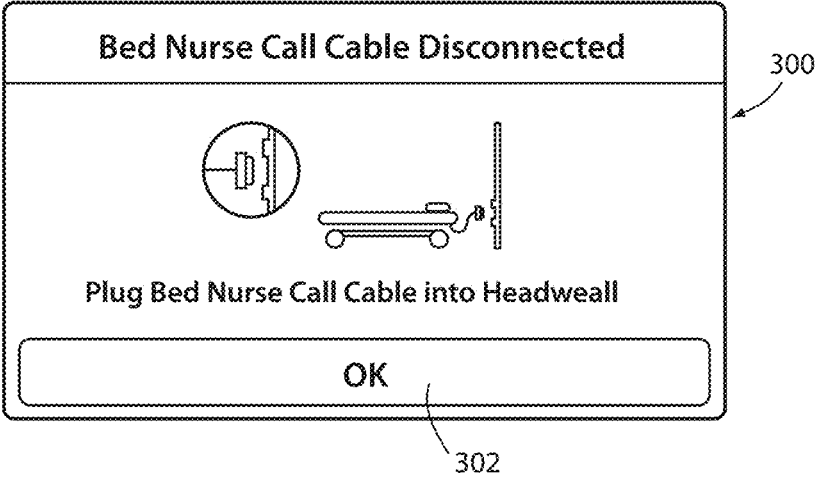
FIG. 12 is a popup window that may be displayed on a display of the patient support apparatus when a communication cable is not coupled between the patient support apparatus and a wall outlet.

FIG. 12 illustrates a popup window 300 that controller 112 is adapted to display on display 124 of control panel 48a when a nurse call cable 90 is not coupled between patient support apparatus 20 and wall outlet 60. Thus, controller 112 is adapted to display window 300 when communication sensor 120 does not detect a voltage on either of pins 114a or 114b. Window 300 may be displayable on both first and second generations of patient support apparatuses 20.

Popup window 300 is a dismissable popup. That is, window 300 includes an "OK" or acceptance control 302 that may be touched, or otherwise activated, by a user. When the acceptance control 302 is activated, controller 112 ceases to display window 300 on display 124, and instead returns to displaying whatever content was previously displayed prior to displaying window 300. If the user does not touch the acceptance control 302, controller 112 continues to display window 300 until the user corrects the communication connection between patient support apparatus 20 and nurse call system 68 (e.g. by plugging cable 90 into both wall outlet 60 and patient support apparatus 20). In some embodiments, controller 112 is adapted to also stop displaying, or not display at all, window 300 if patient support apparatus 20 is a second generation patient support apparatus and its wireless interface 100 is able to establish communication with a wireless headwall unit 94 that is currently coupled by a cable 90 to wall outlet 60. In some embodiments, controller 112 ceases to display window 300 for a set amount of time after the user presses the acceptance control 302, and if the communication link 58 between the patient support apparatus 20 and the wall outlet 60 is not remedied in that time, to re-display window 300. Acceptance control 302 is one of several controls that may correspond to the "cancel control" of steps 178 and/or 196 of algorithm 150 or steps 238 and/or 256 of algorithm 210.

Figure 13:
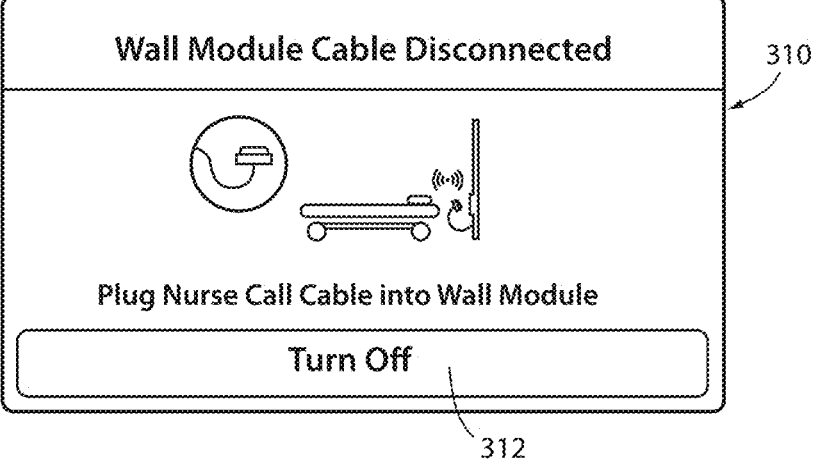
FIG. 13 is a popup window that may be displayed on a display of the patient support apparatus when a communication cable is not coupled between the headwall unit and a wall outlet.

FIG. 13 illustrates another popup window 310 that controller 112 is adapted to display on display 124 of control panel 48a when a nurse call cable 90 is not coupled between wireless headwall unit 94 and wall outlet 60. Popup window is only displayed on second generation patient support apparatuses 20 when they are in communication with second generation headwall units 94. When controller 112 is in communication with wireless headwall unit 94 and wireless headwall unit 94 reports to controller 112 that its interface 116 is not coupled to outlet 60 by way of a cable 90 (as detected by communication sensor 132), controller 112 is adapted to display popup window 310. As with popup window 300, window 310 is a dismissable popup window that includes a "turn off" or cancel control 312. Controller 112 continues to display window 310 until the user either activates cancel control 312 or a cable 90 is coupled between wireless headwall unit 94 and wall outlet 60. In some embodiments, controller 112 will also cease displaying window 310 if sensor 120 detects that a cable 90 has been coupled between cable interface 88 and wall outlet 60, thereby enabling patient support apparatus 20 to communicate with the nurse call system by a wireless communication link 58. Cancel control 312 is one of several controls that may correspond to the "cancel control" of step 178 of algorithm 150 or step 238 of algorithm 210.

Figure 14:
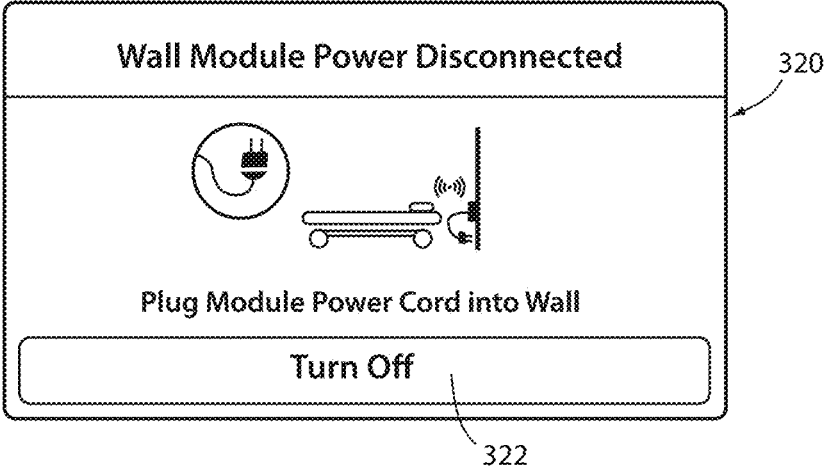
FIG. 14 is a popup window that may be displayed on a display of the patient support apparatus when a power cable is not coupled between the patient support apparatus and an electrical outlet.

FIG. 14 illustrates another popup window 320 that controller 112 is adapted to display on display 124 of control panel 48a when a power cable 106 of headwall unit 94 is not coupled to an electrical outlet 108. Popup window 320 may be displayed on second generation patient support apparatuses 20 that are in communication with second generation headwall units 94. In such situations, the second generation headwall unit 94 includes circuitry to detect the absence/presence of a power cable 106 coupled thereto and sends a message via BT transceiver 140 to patient support apparatus 20 when it is not receiving electrical power from an electrical outlet 108. Controller 112 of patient support apparatus 20 responds to this message by displaying popup window 320 and, in some embodiments, by sending a message to server 78 indicating that no power cable is currently connected to that particular headwall unit 94. Popup window 320 includes a "turn off" or dismiss control 322 that, when pressed, causes controller 112 to stop displaying popup window 320. In some embodiments, controller 112 ceases to display window 320 for a set amount of time after the user presses the dismiss control 322, and if the power cable 106 is not plugged into an electrical outlet 108 during that set amount of time, controller 112 re-displays window 320.

Figure 15:
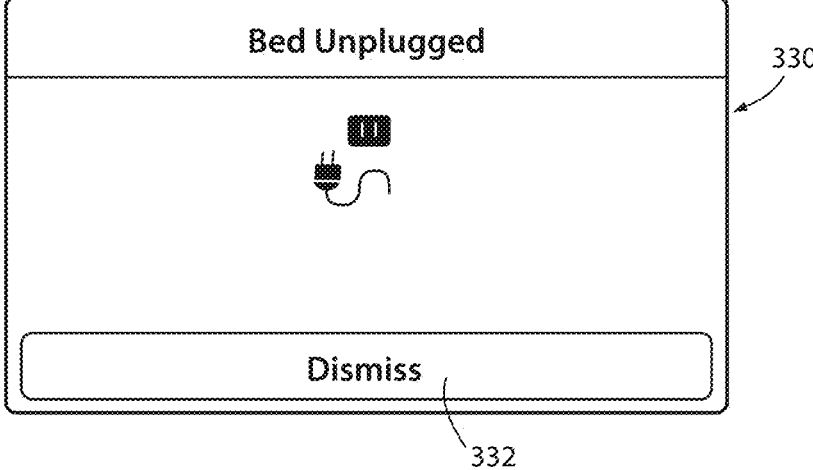
FIG. 15 is a popup window that may be displayed on a display of the patient support apparatus when a power cable is not coupled between the headwall unit and an electrical outlet.

FIG. 15 illustrates another popup window 330 that controller 112 is adapted to display on display 124 of control panel 48a when a power cable of patient support apparatus 20 is not coupled to an electrical outlet 108. Popup window 330 may be displayed on both first and second generation patient support apparatuses 20, regardless of whether they are in communication with a first or second generation headwall unit 94 (or in communication with neither). Patient support apparatus 20 includes circuitry to detect the absence/ presence of a power cable coupled to it, and in the absence of receiving electrical power from an electrical outlet 108, controller 112 displays window 330. Controller 112 may also send a message to server 78 indicating that no power cable is currently connected to that particular patient support apparatus 20. Popup window 330 includes a dismiss control 332 that, when pressed, causes controller 112 to stop displaying popup window 330. In some embodiments, controller 112 ceases to display window 330 for a set amount of time after the user presses the dismiss control 332, and if a power cable of patient support apparatus 20 is not plugged into an electrical outlet 108 during that set amount of time, controller 112 re-displays window 330.

In some embodiments, patient support apparatus 20 may only display popup windows 320 and/or 330 if the battery 122 or 134 is also below a certain charge threshold. Alternatively, in some embodiments, patient support apparatus 20 may display popup windows 320 and/or 330 regardless of the charge level of battery 122 or 134.

It will be understood by those skilled in the art that the use of the term "transceiver" throughout this specification is not intended to be limited to devices in which a transmitter and receiver are necessarily within the same housing, or share some circuitry. Instead, the term "transceiver" is used broadly herein to refer to both structures in which circuitry is shared between the transmitter and receiver, and transmitter-receivers in which the transmitter and receiver do not share circuitry and/or a common housing. Thus, the term "transceiver" refers to any device having a transmitter component and a receiver component, regardless of whether the two components are a common entity, separate entities, or have some overlap in their structures.

Various additional alterations and changes beyond those already mentioned herein can be made to the above-described embodiments. This disclosure is presented for illustrative purposes and should not be interpreted as an exhaustive description of all embodiments or to limit the scope of the claims to the specific elements illustrated or described in connection with these embodiments. For example, and without limitation, any individual element(s) of the described embodiments may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Any reference to claim elements in the singular, for example, using the articles "a," "an," "the" or "said," is not to be construed as limiting the element to the singular.

What is claimed is:

1. A patient support apparatus comprising:

a support surface adapted to support a patient thereon;

a first infrared transceiver adapted to wirelessly communicate with a second infrared transceiver positioned onboard a headwall unit mounted to a headwall of a room of a healthcare facility;

a first radio frequency transceiver adapted to wirelessly communicate with a second radio frequency transceiver positioned off-board the patient support apparatus; and a controller adapted to analyze a message received from the headwall unit via the first infrared transceiver to determine if the headwall unit belongs to a first class or a second class of headwall units, wherein the first class of headwall units are adapted to wirelessly transmit audio signals to the first radio frequency transceiver of the patient support apparatus, and the second class of headwall units are not adapted to wirelessly transmit audio signals to the first radio frequency transceiver of the patient support apparatus.

2. The patient support apparatus of claim 1 further comprising a network transceiver adapted to communicate with a wireless access point of a healthcare facility computer network, wherein the controller is adapted to transmit a class identification message to a server on the healthcare facility computer network using the network transceiver, and the class identification message indicates what class the headwall unit belongs to.

3. The patient support apparatus of claim 1 further comprising a nurse call cable interface adapted to be coupled by a nurse call cable to a wall outlet mounted in the headwall, and a sensor adapted to detect when the nurse call cable interface is not electrically coupled to the wall outlet.

4. The patient support apparatus of claim 3 wherein the controller is further adapted to issue an alert if controller detects both of the following: (a) the nurse call cable interface is not currently electrically coupled to the wall outlet, and (b) the headwall unit belongs to the second class of patient support apparatuses.

5. The patient support apparatus of claim 4 wherein the controller is adapted to issue the alert by displaying an indicator on a screen of a display attached to the patient support apparatus.

6. The patient support apparatus of claim 5 further comprising a network transceiver adapted to communicate with a wireless access point of a healthcare facility computer network, and wherein the controller is further adapted to issue the alert by sending an alert message to a server of the healthcare facility computer network using the network transceiver.

7. The patient support apparatus of claim 1 wherein the controller is further adapted to send a television control message to the headwall unit, the television control message adapted to change a state of a television in communication with the headwall unit.

8. The patient support apparatus of claim 1 further comprising an exit detection system adapted to detect when a patient onboard the patient support apparatus exits therefrom and wherein the controller is further adapted to send an exit detection message to the headwall unit, the exit detection message adapted to notify a nurse call system of the patient's exit from the patient support apparatus.

9. A patient support apparatus communication system comprising:
  a headwall unit mounted to a headwall of room of a healthcare facility;
  a patient support apparatus adapted to support a patient thereon, the patient support apparatus further adapted to wirelessly communicate with the headwall unit when the patient support apparatus is positioned adjacent thereto; and
  a server in communication with the patient support apparatus, the server adapted to determine if the patient support apparatus belongs to a first class or a second class of patient support apparatuses, the server further adapted to determine if the headwall unit belongs to a third class or a fourth class of headwall units, the server still further adapted to send a warning message to a caregiver if the patient support apparatus belongs to the first class and the headwall unit belongs to the fourth class, and to not send the warning message to the caregiver if the patient support apparatus belongs to the first class and the headwall unit belongs to the third class.

10. The patient support apparatus communication system of claim 9 wherein the server is further adapted to send the warning message to the caregiver if the patient support apparatus belongs to the second class and the headwall unit belongs to the third class.

11. The patient support apparatus communication system of claim 10 wherein the server is further adapted to not send the warning message to the caregiver if the patient support apparatus belongs to the second class and the headwall unit belongs to the fourth class.

12. The patient support apparatus of claim 11 wherein the first class of patient support apparatuses are adapted to wirelessly transmit patient audio signals to a radio frequency transceiver of the headwall unit, and the second class of patient support apparatuses are not adapted to wirelessly transmit patient audio signals to the radio frequency transceiver of the headwall unit.

13. The patient support apparatus communication system of claim 12 wherein the third class of headwall units are adapted to wirelessly transmit nurse audio signals to the patient support apparatus and the fourth class of headwall units are not adapted to wirelessly transmit nurse audio signals to the patient support apparatus.

14. The patient support apparatus communication system of claim 9 wherein the server is adapted to send the warning message to the caregiver by sending a message to the patient support apparatus that causes the patient support apparatus to display a warning on a display of the patient support apparatus.

15. The patient support apparatus communication system of claim 9 wherein the server is adapted to send the warning message to the caregiver by sending a message to a portable electronic device associated with caregiver.

16. The patient support apparatus communication system of claim 9 wherein the headwall unit includes:
  a nurse call interface adapted to electrically couple to a wall outlet mounted in the headwall, the nurse call interface including a plurality of first pins adapted to electrically couple to a plurality of second pins defined in the wall outlet when the nurse call interface is coupled to the wall outlet; and
  a first infrared transceiver adapted to wirelessly communicate with a second infrared transceiver positioned onboard the patient support apparatus when the patient support apparatus is positioned adjacent to the headwall unit.

17. The patient support apparatus communication system of claim 9 wherein the patient support apparatus further includes a first infrared transceiver adapted to wirelessly communicate with a second infrared transceiver positioned onboard the headwall unit.

* * * * *